US011122472B2

(12) United States Patent
Da Silva

(10) Patent No.: US 11,122,472 B2
(45) Date of Patent: Sep. 14, 2021

(54) METHOD AND SYSTEM FOR BEAM TRACKING FAILURE RECOVERY

(71) Applicant: Telefonaktiebolaget LM Ericsson (publ), Stockholm (SE)

(72) Inventor: Icaro Leonardo J. Da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/469,570

(22) PCT Filed: Mar. 22, 2018

(86) PCT No.: PCT/SE2018/050298
§ 371 (c)(1),
(2) Date: Jun. 13, 2019

(87) PCT Pub. No.: WO2018/174800
PCT Pub. Date: Sep. 27, 2018

(65) Prior Publication Data
US 2020/0084089 A1    Mar. 12, 2020

Related U.S. Application Data

(60) Provisional application No. 62/475,939, filed on Mar. 24, 2017.

(51) Int. Cl.
*H04L 12/28* (2006.01)
*H04W 36/00* (2009.01)
(Continued)

(52) U.S. Cl.
CPC ....... *H04W 36/0061* (2013.01); *H04L 1/0026* (2013.01); *H04L 5/0048* (2013.01);
(Continued)

(58) Field of Classification Search
CPC ......... H04W 36/0061; H04W 36/0085; H04W 36/06; H04W 72/046; H04W 72/042;
(Continued)

(56) References Cited

U.S. PATENT DOCUMENTS

RE43,871 E  * 12/2012  Sanders ................ H04W 24/00
                                                                   370/328
2003/0156534 A1* 8/2003  Coulson .............. H04L 27/2647
                                                                   370/210
(Continued)

FOREIGN PATENT DOCUMENTS

CN    102017447 A    4/2011
CN    103974412 A    8/2014
(Continued)

OTHER PUBLICATIONS

Final Office Action for U.S. Appl. No. 16/063,118, dated Dec. 19, 2019, 22 pages.
(Continued)

*Primary Examiner* — Thai D Hoang
(74) *Attorney, Agent, or Firm* — Withrow & Terranova, PLLC

(57) ABSTRACT

In some embodiments herein a wireless device for handling communication of the wireless device in a wireless communication network is provided. The wireless communication network comprises a radio network node configured to serve the wireless device in a serving cell. The wireless device is configured to perform a beam tracking of the serving cell for tracking one or more beams of the serving cell based on measured signal strength or measured signal quality, and to detect a beam failure process in the serving cell. The wireless device is further configured to, in response to detection of the beam failure process, trigger a beam recovery process associated with a DL beam for the serving cell, wherein the DL beam is selected based on the beam
(Continued)

tracking performed prior to detecting the beam failure process.

15 Claims, 14 Drawing Sheets

(51) Int. Cl.
| | |
|---|---|
| *H04L 1/00* | (2006.01) |
| *H04L 5/00* | (2006.01) |
| *H04W 16/28* | (2009.01) |
| *H04W 36/06* | (2009.01) |
| *H04W 72/04* | (2009.01) |
| *H04W 74/08* | (2009.01) |
| *H04L 12/24* | (2006.01) |
| *H04W 24/08* | (2009.01) |

(52) U.S. Cl.
CPC ........ *H04L 5/0051* (2013.01); *H04L 41/0668* (2013.01); *H04W 16/28* (2013.01); *H04W 24/08* (2013.01); *H04W 36/0085* (2018.08); *H04W 36/06* (2013.01); *H04W 72/042* (2013.01); *H04W 72/046* (2013.01); *H04W 74/0833* (2013.01)

(58) Field of Classification Search
CPC . H04W 74/0833; H04W 16/28; H04W 24/08; H04L 1/0026; H04L 5/0048; H04L 5/0051; H04L 41/0668
USPC ................. 370/225–228, 242–248, 250–253
See application file for complete search history.

(56) References Cited

U.S. PATENT DOCUMENTS

| | | | |
|---|---|---|---|
| 2005/0101326 A1 | 5/2005 | Kang et al. | |
| 2011/0080825 A1 | 4/2011 | Dimou et al. | |
| 2011/0170422 A1 | 7/2011 | Hu et al. | |
| 2015/0004970 A1 | 1/2015 | Venkatachari et al. | |
| 2015/0181479 A1 | 6/2015 | Lin et al. | |
| 2015/0282076 A1* | 10/2015 | Larmo ............... | H04W 36/0088 370/311 |
| 2015/0289141 A1* | 10/2015 | Ghasemzadeh ....... | H04W 16/14 370/330 |
| 2015/0341148 A1* | 11/2015 | Kazmi .................. | H04L 5/0098 370/252 |
| 2016/0183233 A1* | 6/2016 | Park ....................... | H04W 16/30 370/331 |
| 2016/0353510 A1* | 12/2016 | Zhang ................... | H04B 7/0617 |
| 2017/0006593 A1 | 1/2017 | Liu | |
| 2017/0264406 A1* | 9/2017 | Lei ....................... | H04L 27/2613 |
| 2018/0006770 A1 | 1/2018 | Guo et al. | |
| 2018/0034525 A1 | 2/2018 | Park et al. | |
| 2018/0083680 A1 | 3/2018 | Guo et al. | |
| 2018/0192347 A1 | 7/2018 | Shaheen | |
| 2018/0192432 A1 | 7/2018 | Tenny et al. | |
| 2018/0359790 A1 | 12/2018 | Ingale et al. | |
| 2019/0149365 A1* | 5/2019 | Chatterjee ............. | H04L 5/0092 370/329 |
| 2019/0261195 A1* | 8/2019 | Cheng ................... | H04W 24/10 |
| 2019/0320355 A1 | 10/2019 | Da Silva | |
| 2020/0045767 A1* | 2/2020 | Velev ...................... | H04W 8/24 |
| 2020/0120584 A1* | 4/2020 | Yi .......................... | H04L 5/0048 |

FOREIGN PATENT DOCUMENTS

| | | |
|---|---|---|
| CN | 106105073 A | 11/2016 |
| CN | 106134236 A | 11/2016 |
| WO | 2017022870 A1 | 2/2017 |
| WO | 2017022902 A1 | 2/2017 |
| WO | 2017024516 A1 | 2/2017 |
| WO | 2018067307 A1 | 4/2018 |
| WO | 2018174801 A1 | 9/2018 |

OTHER PUBLICATIONS

Non-Final Office Action for U.S. Appl. No. 16/063,118, dated Mar. 2, 2020, 22 pages.
Examination Report for European Patent Application No. 18714633.7, dated Feb. 4, 2020, 4 pages.
Examination Report for European Patent Application No. 18771153.6, dated Jan. 22, 2020, 6 pages.
Nokia et al., "R2-1701681: Beam Recovery in NR," 3GPP TSG-RAN WG2 Meeting #97, Feb. 13-17, 2017, Athens, Greece, 5 pages.
Non-Final Office Action for U.S. Appl. No. 16/063,118, dated Aug. 28, 2019, 17 pages.
Supplementary European Search Report for European Patent Application No. 18771153.6, dated Nov. 22, 2019, 4 pages.
Examination Report for European Patent Application No. 18771153.6, dated Sep. 1, 2020, 5 pages.
Final Office Action for U.S. Appl. No. 16/063,118, dated Jun. 9, 2020, 23 pages.
Non-Final Office Action for U.S. Appl. No. 16/063,118, dated Sep. 8, 2020, 23 pages.
Final Office Action for U.S. Appl. No. 16/063,118, dated Dec. 28, 2020, 24 pages.
Examination Report for European Patent Application No. 18771153.6, dated Mar. 1, 2021, 6 pages.
Author Unknown, "Technical Specification Group Radio Access Network; Evolved Universal Terrestrial Radio Access (E-UTRA); Radio Resource Control (RRC); Protocol specification (Release 13)," Technical Specification 36.331, Version 13.0.0, 3GPP Organizational Partners, Dec. 2015, 507 pages.
Huawei, et al., "R2-1701130: Measurement and Mobility Considering Beamforming," Third Generation Partnership Project (3GPP), TSG-RAN2 Meeting #97, Feb. 13-17, 2017, 6 pages, Athens, Greece.
Qualcomm, "R1-1705581: Beam management for NR," Third Generation Partnership Project (3GPP), TSG RAN1 #88bis, Apr. 3-7, 2017, 7 pages, Spokane, USA.
Samsung, "R1-170xxxx: CSI-RS for beam management," Third Generation Partnership Project (3GPP), TSG RAN WG1#88, Apr. 3-7, 2017, 7 pages, Spokane, USA.
Samsung, "R1-1702910: Mobility RS and procedure," Third Generation Partnership Project (3GPP), TSG RAN WG1#88, Feb. 13-17, 2017, 5 pages, Athens, Greece.
Samsung, "R2-162226: Discussion on Beam Measurement and Tracking for 5G New Radio Interface in mmWave Frequency Bands," Third Generation Partnership Project (3GPP), TSG RAN WG2 #93bis, Apr. 11-15, 2016, 5 pages, Dubrovnik, Croatia.
International Search Report and Written Opinion for International Patent Application No. PCT/SE2018/050299, dated May 15, 2018, 11 pages.
International Search Report and Written Opinion for International Patent Application No. PCT/SE2018/050298, dated Aug. 1, 2018, 12 pages.
Non-Final Office Action for U.S. Appl. No. 16/063,118, dated Jun. 25, 2021, 25 pages.
CATT, "R2-1700223: Further consideration on Inter-cell HO mechanism," 3GPP TSG-RAN WG2 NR Ad Hoc, Spokane, Washington, Jan. 17-19, 2017, 3 pages.
CMCC, "R2-1701921: Beam Related Measurement Report and Inter-cell HO in NR," 3GPP TSG-RAN WG2 Meeting #97, Athens, Greece, Feb. 13-17, 2017, 7 pages.
Ericsson, "R2-1700863: Further details of handover execution in NR," 3GPP TSG-RAN WG2 Meeting #97, Athens, Greece, Feb. 13-17, 2017, 5 pages.
Examination Report for European Patent Application No. 18714633.7, dated Jun. 17, 2021, 9 pages.
First Office Action for Chinese Patent Application No. 201880007984.2, dated May 6, 2021, 23 pages.
First Office Action for Chinese Patent Application No. 201880007995.0, dated Apr. 26, 2021, 17 pages.

* cited by examiner

CSI-RS-Config information elements

```
-- ASN1START

CSI-RS-Config-r10 ::=           SEQUENCE {
    csi-RS-r10                      CHOICE {
        release                         NULL,
        setup                           SEQUENCE {
            antennaPortsCount-r10           ENUMERATED {an1, an2, an4, an8},
            resourceConfig-r10              INTEGER (0..31),
            subframeConfig-r10              INTEGER (0..154),
            p-C-r10                         INTEGER (-8..15)
        }
    }                                                                           OPTIONAL,
    zeroTxPowerCSI-RS-r10           ZeroTxPowerCSI-RS-Conf-r12                  OPTIONAL
-- Need ON
}
-- Need ON CSI-RS-Config-v1250 ::=         SEQUENCE {
    zeroTxPowerCSI-RS2-r12          ZeroTxPowerCSI-RS-Conf-r12                  OPTIONAL,
-- Need ON
    ds-ZeroTxPowerCSI-RS-r12        CHOICE {
        release                         NULL,
        setup                           SEQUENCE {
            zeroTxPowerCSI-RS-List-r12      SEQUENCE (SIZE (1..maxDS-ZTP-CSI-RS-r12)) OF
ZeroTxPowerCSI-RS-r12
        }
    }                                                                           OPTIONAL
-- Need ON
}

CSI-RS-Config-v1310 ::=         SEQUENCE {
    eMIMO-Type-r13                  CSI-RS-ConfigEMIMO-r13                      OPTIONAL    -- Need ON
}

ZeroTxPowerCSI-RS-Conf-r12 ::=  CHOICE {
    release                         NULL,
    setup                           ZeroTxPowerCSI-RS-r12
}

ZeroTxPowerCSI-RS-r12 ::=       SEQUENCE {
    zeroTxPowerResourceConfigList-r12       BIT STRING (SIZE (16)),
    zeroTxPowerSubframeConfig-r12           INTEGER (0..154)
}

-- ASN1STOP
```

FIG. 6

METHOD AND SYSTEM FOR BEAM TRACKING FAILURE RECOVERY

This application is a 35 U.S.C. § 371 national phase filing of International Application No. PCT/SE2018/050298, filed Mar. 22, 2018, which claims the benefit of U.S. Provisional Application No. 62/475,939, filed Mar. 24, 2017, the disclosures of which are incorporated herein by reference in their entireties.

TECHNICAL FIELD

Embodiments herein relate to a wireless device and a method performed therein regarding wireless communication. Furthermore, a computer program and a computer-readable storage medium are also provided herein. In particular, embodiments herein relate to handling communication such as handling or enabling a beam recovery process of the wireless device in a wireless communication network.

BACKGROUND

In a typical wireless communication network, wireless devices, also known as wireless communication devices, mobile stations, stations (STA) and/or user equipments (UE), communicate via a Radio access Network (RAN) with one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a "NodeB" or "eNodeB". The service area or cell area is a geographical area where radio coverage is provided by the radio network node. The radio network node operates on radio frequencies to communicate over an air interface with the wireless devices within range of the radio network node. The radio network node communicates over a downlink (DL) to the wireless device and the wireless device communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the $3^{rd}$ 3GPP and this work continues in the coming 3GPP releases, such as 4G and 5G networks such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Scheduled reference signals, called channel-state information reference signals (CSI-RS), are transmitted when needed for a particular connection. Channel-state information (CSI) comprises channel quality indicator (CQI), precoding matrix indicator (PMI), and rank indicator (RI). The CQI is reported by wireless device to the radio network node. The wireless device indicates modulation scheme and coding scheme to the radio network node. To predict the downlink channel condition, CQI feedback by the wireless device may be used as an input. CQI reporting can be based on PMI and RI. PMI is indicated by the wireless device to the radio network node, which precoding matrix may be used for downlink transmission which is determined by RI. The wireless device further indicates the RI to the radio network node, i.e. RI indicates the number of layers that should be used for downlink transmission to the wireless device. The decision when and how to transmit the CSI-RS is made by the radio network node and the decision is signalled to the involved wireless devices using a so-called measurement grant. When the wireless device receives a measurement grant it measures on a corresponding CSI-RS. The radio network node may choose to transmit CSI-RSs to a wireless device only using beam(s) that are known to be strong for that wireless device, to allow the wireless device to report more detailed information about those beams. Alternatively, the radio network node may choose to transmit CSI-RSs also using beam(s) that are not known to be strong for that wireless device, for instance to enable fast detection of new beam(s) in case the wireless device is moving.

The radio network nodes of a new radio (NR) network transmit other reference signals as well. For instance, the radio network nodes may transmit so-called demodulation reference signals (DMRS) when transmitting control information or data to a wireless device. Such transmissions are typically made using beam(s) that are known to be strong for that wireless device.

In LTE, the main goal of CSI-RSs is to obtain channel state feedback for up to eight transmit antenna ports to assist the radio network node in its precoding operations. Release 10 supports transmission of CSI-RS for 1, 2, 4 and 8 transmit antenna ports. CSI-RSs also enable the wireless device to estimate the CSI for multiple cells rather than just its serving cell, to support future multi-cell cooperative transmission schemes. Notice that the purpose of CSI-RS measurements in LTE is not to support mobility across cells.

The CSI-RS resource allocation for a given subframe is shown in FIG. 1. Code division multiplexing (CDM) codes of length two are used, so that CSI-RSs on two antenna ports share two resource elements (RE) on a given subcarrier. The resource elements used in the case of two CSI-RS antenna ports are a subset of those used for four and eight antenna ports; this helps to simplify the implementation. The total number of supported antenna ports may be forty, which can be used to give a frequency-reuse factor of five between cells with eight antenna ports per cell, or a factor of twenty in the case of two antenna ports.

The CSI-RS configuration is wireless device-specific i.e. provided via dedicated Radio Resource Control (RRC) signalling. When configured, CSI-RSs are present only in some subframes following a given duty cycle and subframe offset. The duty cycle and offset of the subframes containing CSI-RSs and the CSI-RS pattern used in those subframes are provided to a Release 10 wireless device through RRC signalling. The duty cycle and subframe offset are jointly coded, while the CSI-RS pattern is configured independently of these two parameters.

In summary, the CSI-RS configuration may comprise the following, at least in LTE:

The number of CSI-RS: e.g. 1, 2, 4 or 8;
The CSI-RS periodicity: e.g. 5 ms, 10 ms, 20 ms, 40 ms or 80 ms;
The CSI-RS subframe offset within the CSI-RS period;
The exact CSR-RS configuration within a resource-block pair—that is exactly what resource elements from the 40 possible REs are used for the up to eight CSI-RS in a resource-block pair.

In the context of cooperative MIMO, it may be possible to improve the performance of channel estimation, and especially interference estimation, by coordinating CSI-RS transmissions across multiple service areas. In Release 10 it is therefore possible to 'mute' a set of REs in data transmissions from a service area. The locations of these REs, known as a 'muting pattern', may be chosen to avoid colliding with CSI-RS transmissions from other service areas and hence improve the inter-cell measurement quality. Notice that in the multi-cell case, there can be some level of coordination so that CSI-RS resource allocation tries to avoid the interference across Transmission and Reception Points (TRP) and/or service areas, as shown in the FIG. 3 where CSI-RS configuration 0 differs from CSI-RS configuration 1 that also differs from CSI-RS configuration 2. Another important aspect relates to how the wireless device receiver handles the CSI-RS. In LTE, time and frequency (T/F) synchronization is obtained from primary synchronization signal (PSS), secondary synchronization signal (SSS), and/or cell specific reference signal (CRS), and a fast fourier transform (FFT) is applied to relevant CSI-RS symbols and removes the embedded own-cell identity (ID) or RRC configured virtual cell ID, which are 504 possibilities.

The work on Rel-13 full dimension (FD)-MIMO specification in LTE primary includes the support for beamforming in LTE. The wireless device can be configured with a set of CSI-RS processes that may be associated at the network side to different Downlink (DL) beams, which can be different for the different subframes. With beamformed CSI-RS, the wireless device should measure CSI on CSI-RS resources that are beamformed towards different directions, see FIG. 4.

Rel-13 FD-MIMO specification in LTE supports an enhanced CSI-RS reporting called Class B for beamformed CSI-RS. Therein, an LTE RRC_CONNECTED wireless device may be configured with K beams, where e.g. 8>K>1, and where it may be 1, 2, 4 or 8 port number for each beam. For feedback purposes such as PMI, RI and CQI there is a CSI-RS resource indicator (CRI) per CSI-RS, see FIG. 5. The wireless device reports CRI to indicate the preferred beam where the CRI is wideband, RI/CQI/PMI is based on legacy codebook, i.e. Rel-12, and CRI reporting period is an integer multiple of the RI. For Rel-14 enhancements in Full Dimension (eFD)-MIMO, the following is being considered as potential enhancements such as an extension of CSI-RS antenna port number up to 32 i.e. {20, 24, 28, 32} CSI-RS ports and the introduction of aperiodic CSI-RS.

According to the TS 36.331 v. 13.0.0 the CSI-RS configuration, encoded in the CSI-RS-Config IE, can either be transmitted in the RRCConnectionSetup, RRCConnectionResume or the RRC Connection Reconfiguration, with or without mobility Control Information (i.e. in a handover command). See FIG. 6 wherein the CSI-RS configuration is transmitted in the RRCConnectionSetup.

CSI-RS may be the primary RS for beam management. Compared to the beamformed CSI-RS in LTE, perhaps the main additional use case would be an analog beam sweep, possibly also used for fine T/F tracking. Hence, more flexibility for the NR CSI-RS in NR is also envisioned such as:

Possibly transmitted within 1, 2 or 4 symbols;
Configurable bandwidth, i.e. not always full system as in LTE;
Orthogonal Frequency Division Multiplexing (OFDM) symbol may carry CSI-RS only;
Aperiodic, semi-persistent and periodic transmissions;

Note: Most of the usages of CSI-RS in LTE and so far mentioned in NR are related to measurements to support beam management. In addition to that, CSI-RS may be used for radio resource management (RRM) measurements to support inter-cell mobility i.e. movement between different cells, although details have not been defined.

In NR, there will be deployment in higher frequencies and beamforming will be widely used even for the basic control signals and channels, such as reference signals used for RRM. In addition, design principles in 3GPP point to the direction where random access channel (RACH) resources are portioned per DL beam transmitting RS for RRM and synchronization, so called a Synchronization Signal (SS) Block Burst Set. So every SS Block may contain its own RACH configuration i.e. Time and Frequency (T/F) resources and even preamble sub-set. The SS Block will contain in its structure some kind of RS that may be used to indicate the beam, e.g. tertiary synchronization sequence (TSS) or DMRS, although it can possibly be transmitted as a codeword in the SS Block, jointly with the PSS and/or SSS and the physical broadcast channel (PBCH), see FIG. 7.

Even without directional reciprocity, the implementation enables the target cell to transmit the random access response (RAR) in the strongest DL beam covering the wireless device thanks to the mapping between RACH configuration (including the preamble) and the target cell DL beam. That allows the wireless device to quickly access a narrow beam in the target right after handover execution.

In LTE, RACH resources are defined per cell i.e. when the wireless device receives the Handover (HO) command the wireless device may immediately initiate RACH, at least assuming the wireless device is synchronized (although dedicated resources can be configured). Meanwhile, in NR, RACH resources are defined per DL beam (or groups of DL beams) to allow an efficient RACH detection using analog beamforming (or groups of beams). Hence, the wireless device may select a DL beam before it initiates random access.

In that case, solutions may point e.g. in two possible directions:
wireless Device receives a handover (HO) command with PRACH mapping to all possible TSS in the target cell;
wireless device receives a HO command with a subset of PRACH configurations mapped to a subset of TSS in the target cell;

Regardless which case is finally captured in the standards (or even if both are possible), the handover performance could be negatively affected in the case the beam selection in the target cell takes too long time. As described in the baseline (and in the LTE specifications), the wireless device may decide to synchronize with the target only after receiving the HO command and at that time it would select the best DL beam to map to the received RACH resources e.g. as a way to avoid maintaining the synchronization with neighbour cells, especially being uncertain which one could be the handover candidate decided by the network. However, since transmissions are sparse in time in NR, differently from LTE where CRS is always available in every subframe, at least 10 or ms could be needed until the first possible beam is detected. If time domain filtering is applied, that would be even worse as multiple occasions would be needed before a selection is made. It could be even worse in analog beamforming, depending on the duration of a full SS Block Burst Set (perhaps yet more 20 ms) which can make handover non-seamless as required in many NR services, such as Ultra-Reliable Low-Latency Communications (URLLC) or even some Mobile Broadband (MBB) services. Since a similar approach is used during a beam recovery process this also leads to a process where it takes too long time to access a different beam and this may in turn lead to a reduced or limited performance of the wireless communication network.

SUMMARY

An object of embodiments herein is to provide a mechanism that improves the performance of the wireless communication network when using beamforming in a wireless communication network.

According to an aspect the object is achieved by providing a method performed by a wireless device for handling communication of the wireless device in a wireless communication network. The wireless device is served by a radio network node in a serving cell. The wireless device performs a beam tracking of the serving cell for tracking one or more beams of the serving cell based on measured signal strength or measured signal quality. The wireless device detects a beam failure process in the serving cell; and in response to detection of the beam failure process, the wireless device triggers a beam recovery process associated with a DL beam for the serving cell, wherein the DL beam is selected based on the beam tracking performed prior to detecting the beam failure process.

It is herein also provided a computer program comprising instructions, which, when executed on at least one processor, causes the at least one processor to carry out the methods herein, as performed by the wireless device. Furthermore, it is herein provided a computer-readable storage medium, having stored thereon a computer program comprising instructions which, when executed on at least one processor, cause the at least one processor to carry out the methods herein, as performed by the wireless device.

According to another aspect the object is achieved by providing a wireless device for handling communication of the wireless device in a wireless communication network. The wireless communication network comprises a radio network node configured to serve the wireless device in a serving cell. The wireless device is configured to perform a beam tracking of the serving cell for tracking one or more beams of the serving cell based on measured signal strength or measured signal quality, and to detect a beam failure process in the serving cell. The wireless device is configured to, in response to detection of the beam failure process, trigger a beam recovery process associated with a DL beam for the serving cell, wherein the DL beam is selected based on the beam tracking performed prior to detecting the beam failure process.

According to yet another aspect the object is achieved by providing a wireless device for handling communication of the wireless device in a wireless communication network, wherein the wireless communication network comprises a radio network node configured to serve the wireless device in a serving cell. The wireless device comprises processing circuitry and a memory, said memory comprising instructions executable by said processing circuitry whereby said wireless device is operative to perform a beam tracking of a serving cell for tracking one or more beams of the serving cell based on measured signal strength or measured signal quality. The wireless device is further operative to detect a beam failure process in the serving cell; and in response to detection of the beam failure process operative to trigger a beam recovery process associated with a DL beam for the serving cell, wherein the DL beam is selected based on the beam tracking performed prior to detecting the beam failure process.

Embodiments herein enable the wireless device to access a beam much faster, immediately after detection of beam failure. That is particularly important in carriers where the signals used for beam selection for random access, in NR, these will be the signals transmitted in the so called SS Block Burst Set, are sparser in time, which will likely be the case in non-standalone carriers, where periodicities could be up to 160 ms, and/or the cases where in analog beamforming directions are multiplexed over multiple SS Burst so that it may take time for the wireless device to detect its best beam. Hence, embodiments herein improve the performance of the wireless communication network.

BRIEF DESCRIPTION OF THE DRAWINGS

Embodiments will now be described in more detail in relation to the enclosed drawings, in which:
FIG. 6 shows a CSI-RS-Config information element;

DETAILED DESCRIPTION

Figure 8A:
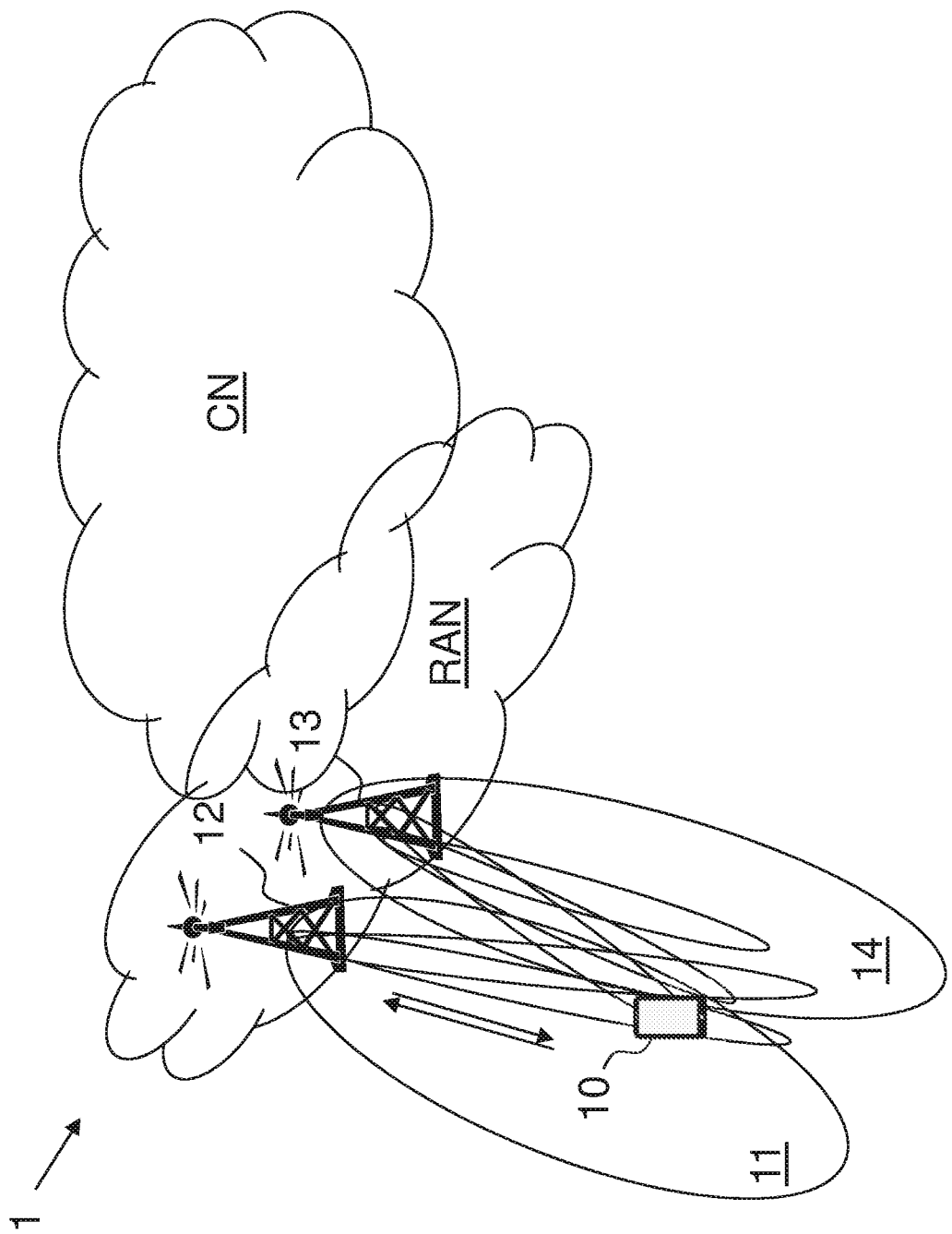
FIG. 8a shows a schematic overview depicting a wireless communication network according to embodiments herein.

Embodiments herein relate to wireless communication networks in general. FIG. 8a is a schematic overview depicting a wireless communication network 1. The wireless communication network 1 comprises one or more RANs and one or more CNs. The wireless communication network 1 may use one or a number of different technologies, such as New Radio (NR), Wi-Fi, LTE, LTE-Advanced, Fifth Generation (5G), Wideband Code-Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context. However, embodiments are also applicable in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine-Type Communication (MTC) device, Device-to-Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first radio network node 12, also referred to as merely the radio network node, providing radio coverage over a geographical area, a first service area 11 or a first beam/beam group, of a first radio access technology (RAT), such as NR, LTE, Wi-Fi, WiMAX or similar. The first radio network node 12 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), gNodeB, a base transceiver station, a radio remote unit, an Access Point Base Station, a base station router, a transmission arrangement of a radio base station, a stand-alone access point or any other network unit or node capable of communicating with a wireless device within the service area served by the first radio network node 12 depending e.g. on the first radio access technology and terminology used. The first radio network node 12 may be referred to as a serving network node wherein the first service area may be referred to as a serving cell with a number of source beams or DL beams, and the serving network node serves and communicates with the wireless device 10 in form of DL transmissions to the wireless device 10 and UL transmissions from the wireless device 10.

A second radio network node 13 may further provide radio coverage over a second service area 14 or a second beam/beam group of a second radio access technology (RAT), such as NR, LTE, WiMAX or similar. The first RAT and the second RAT may be the same or different RATs. The second radio network node 13 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), gNodeB, a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the second radio access technology and terminology used. The second radio network node 13 may be referred to as a neighbour network node wherein the second service area 14 may be referred to as a neighbouring beam or target beam.

It should be noted that a service area may be denoted as a cell, a beam, a mobility measurement beam, a beam group or similar to define an area of radio coverage. The radio network nodes transmit RSs over respective service area. Hence, the first and second radio network nodes may transmit CSI-RSs or beam reference signals (BRS), repeatedly, in time, in a large number of different directions using as many Tx-beams as deemed necessary to cover an operational area of the respective radio network node. Hence the first radio network node 12 provides radio coverage over the first service area using a first reference signal, e.g. first CSI-RS, for the first service area 11 in the wireless communication network 1. The second radio network node 13 provides radio coverage over the second service area 14 using a second reference signal, e.g. second CSI-RS, for the second service area 14 in the wireless communication network.

Herein we focus on a scenario that a beam failure occurs in a serving cell used by the wireless device 10 and the wireless device performs a beam recovery of a different beam of the serving cell. The wireless device may store cell based measurements taking into account best beam and/or N best beam. However, beams are much more unstable than the cell measurements i.e. the measurements associated to the best N beams detected and filtered at the moment the wireless device has performed may be completely outdated at the moment the wireless device detects the beam failure. Hence, using these could simply lead to a wrong beam selection, i.e. to the wrong beam, which may reduce or limit the performance of the wireless communication network. I.e. using previously reported measurements reported to assume beam selection upon random access, instead of up to date measurements obtained due to beam tracking, may lead to a wrong beam selection, i.e. to a wrong beam, which may reduce or limit the performance of the wireless communication network.

According to embodiments herein the wireless device 10 performs beam tracking of the N best beams of the serving cell for tracking one or more beams of the serving cell based on measured signal strength or measured signal quality e.g. based on Signal to Interference plus Noise Ratio (SINR) or equivalent above a certain threshold or relative one another. The wireless device detects a beam failure process, e.g. failure of a beam, in the serving cell. In response to detection of the beam failure process the wireless device triggers a beam recovery process, e.g. perform a beam selection, associated with a DL beam for the serving cell, wherein the DL beam is selected based on the beam tracking performed prior to detecting the beam failure process. E.g. the one or more beams may be a set of candidate beams and if a beam failure occurs, and the wireless device 10 selects one beam out of the set of candidate beams. The set may be configured by the first radio network node 12.

It should be noted that in a general scenario the term "radio network node" can be substituted with "transmission and reception point". One may make a distinction between the transmission reception points (TRPs), typically based on RSs or different synchronization signals and BRSs transmitted. Several TRPs may be logically connected to the same radio network node but if they are geographically separated, or are pointing in different propagation directions, the TRPs will be subject to the same issues as different radio network nodes. In subsequent sections, the terms "radio network node" and "TRP" can be thought of as interchangeable.

It should further be noted that a wireless communication network may be virtually network sliced into a number of Network/RAN slices, each Network/RAN slice supports one or more type of wireless devices and/or one or more type of services i.e. each network slice supports a different set of functionalities. Network slicing introduces the possibility that the network/RAN slices are used for different services and use cases and these services and use cases may introduce differences in the functionality supported in the different network slices. Each network/RAN slice may comprise one or more network nodes or elements of network nodes providing the services/functionalities for the respective network slice. Each network/RAN slice may comprise a network node such as a RAN node and/or a core network node.

Figure 8B:
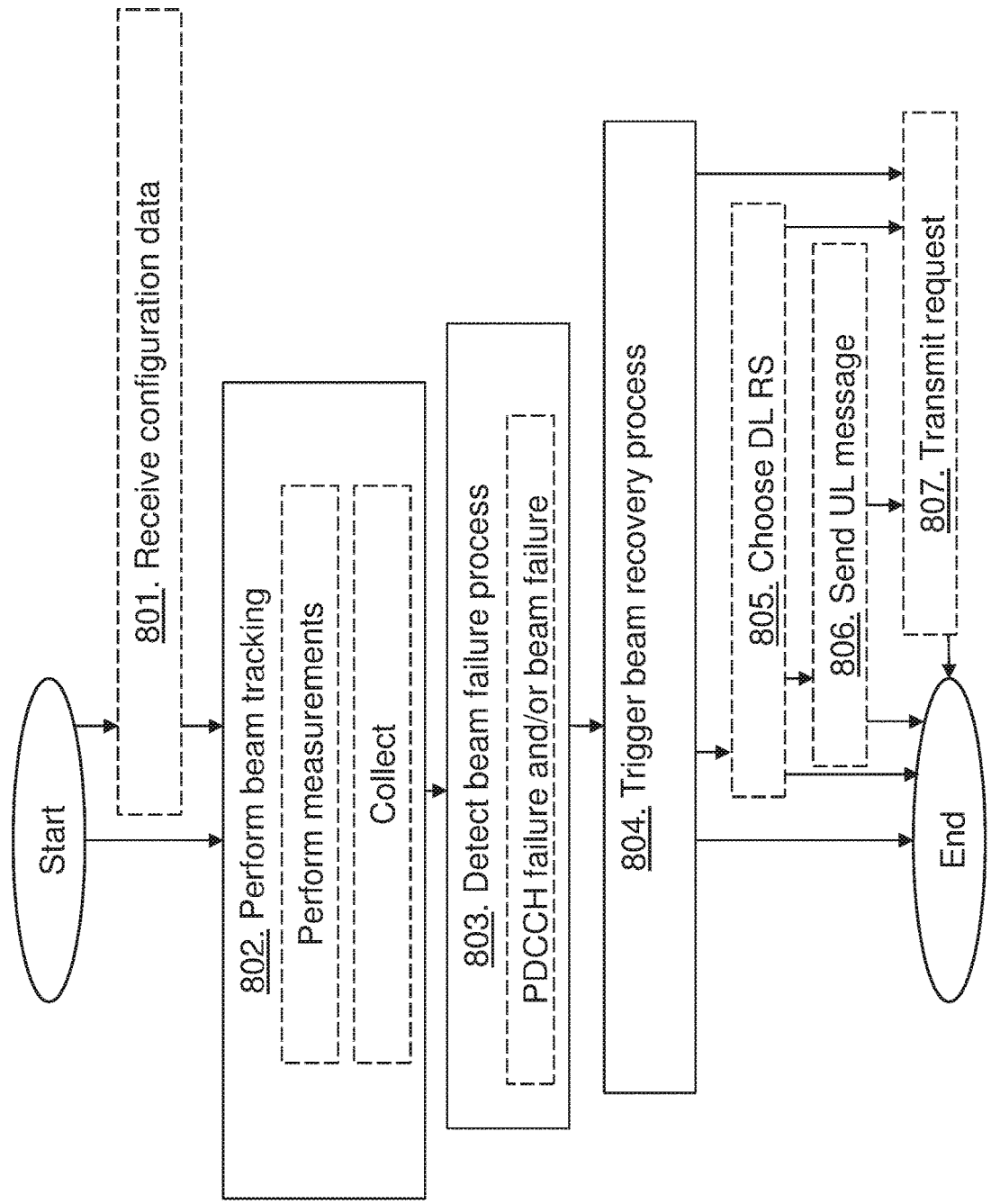
FIG. 8b shows a schematic flowchart depicting a method performed by a wireless device according to embodiments herein.

The method actions performed by the wireless device 10 for handling communication of the wireless device in a wireless communication network according to some embodiments will now be described with reference to a flowchart depicted in FIG. 8b. The actions do not have to be taken in the order stated below, but may be taken in any suitable order. Actions performed in some embodiments are marked with dashed boxes. The wireless device is served by the radio network node such as the first radio network node 12 in the serving cell.

Action 801. The wireless device 10 may receive configuration data comprising a number of beams per cell to be possibly selected when beam failure is detected by the wireless device 10. E.g. the configuration data may comprise candidate beams in the serving cell by the wireless device 1 to be possibly selected upon the detection of beam failure e.g. as a set of one or multiple candidate beams, either based on SSBs indicated by the network and/or based on CSI-RS resources, also indicated by the network. The configuration data may thus indicate beams to be monitored for failure detection; or candidate beams to be selected in case a failure occurs. These candidate beams may be the ones the wireless device 10 should track so that when the failure occurs, the wireless device 10 does not need to start this selection process as the wireless device 10 would already be doing this tracking.

Action 802. The wireless device 10 performs the beam tracking of the serving cell, e.g. one or more serving cells, for tracking one or more beams, e.g. the configured candidate beams described in Action 801, of the serving cell based on measured signal strength or measured signal quality. For example, the wireless device 10 may perform measurements on reference signals for beams for the serving cell, and wherein the DL beam is selected based on the measured signal strength or measured signal quality on reference signals for respective beam. The wireless device 10 may collect multiple samples of measured signal strength such as reference signal received power (RSRP) and/or measured signal quality such as SINR, or reference signal received quality (RSRQ) for a same beam. The beam tracking may comprise collecting in the wireless device 10 a snapshot and/or sample of a synchronization signal, SS, Block Burst or Burst Set, and/or a channel state information-reference signal of the one or more beams.

Action 803. The wireless device 10 detects the beam failure process in the serving cell. For example, the wireless device 10 may detect a physical downlink control channel (PDCCH) failure and/or a downlink beam failure, e.g. the wireless device 10 may detect that the quality of a configure number of beams in the serving cell is degraded according to a configurable level.

Action 804. In response to the detection of the beam failure process, the wireless device 10 triggers the beam recovery process associated with a DL beam for the serving cell, wherein the DL beam is selected based on the beam tracking performed prior to detecting the beam failure process. The beam recovery process may comprise beam selection and thus the wireless device 10 may trigger beam selection with a candidate beam of the serving cell upon detection of beam failure process. The selected DL beam may be denoted first selected beam. The wireless device 10 may reuse measurements taken for other purposes. For example, the wireless device 10 may have been configured with a measurement configuration and, as part of that, the wireless device 10 may perform beam measurements on the serving cell, e.g. to compute cell quality and beam level measurements to be possibly included in measurement reports.

Action 805. The beam recovery process may comprise to choose a downlink reference signal in the DL beam. The wireless device 10 may thus choose the DL RS in the DL beam.

Action 806. The beam recovery process may comprise to transmit an uplink message to inform the radio network node of the DL beam of the chosen downlink reference signal. The wireless device 10 may thus transmit the UL message to inform the radio network node of the DL beam of the chosen downlink reference signal.

Action 807. The wireless device 10 may, when a confirmation for the selected DL beam from the radio network node 12 is lacking during a time window, transmit a request to access another beam being a second best beam according to the performed beam tracking. The firstly selected DL beam may thus be the best beam. During this process of selecting another beam from the set of beams that were tracked, the wireless device 10 may update the measurements on the tracked beams.

Figure 8C:
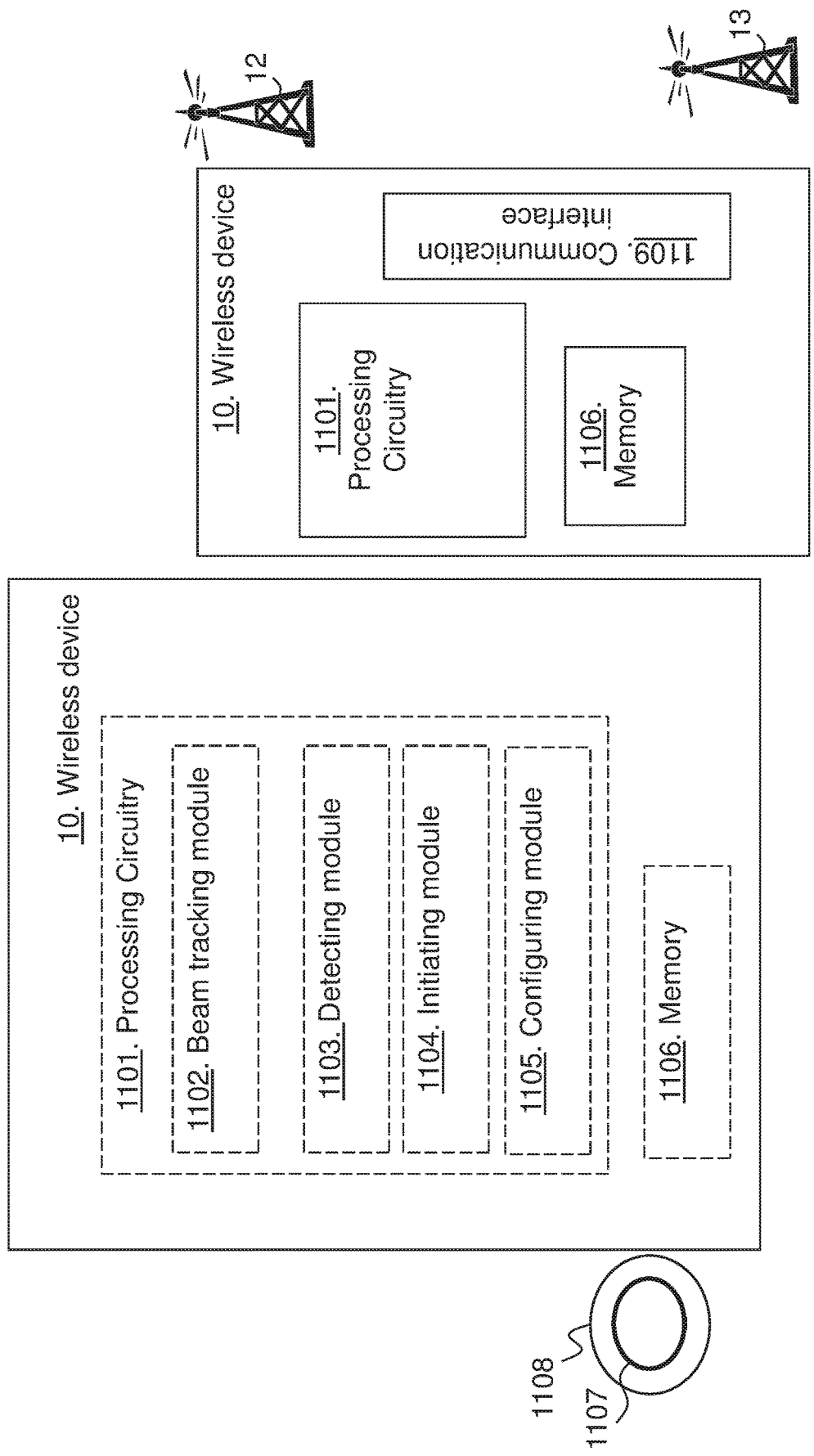
FIG. 8c is a block diagram depicting a wireless device according to embodiments herein.

FIG. 8c is a block diagram depicting two embodiments of the wireless device 10 according to embodiments herein for handling communication of the wireless device 10 in the wireless communication network 1. The wireless communication network 1 comprises a radio network node, such as the first radio network node 12, configured to serve the wireless device in the serving cell.

The wireless device 10 may comprise processing circuitry 1101, e.g. one or more processors, configured to perform the methods herein.

The wireless device 10 may comprise a beam tracking module 1102. The wireless device 10, the processing circuitry 1101, and/or the beam tracking module 1102 is configured to perform the beam tracking of the serving cell for tracking one or more beams of the serving cell based on measured signal strength or measured signal quality. E.g. perform a beam tracking of one or more best beams from/of a set of candidate beams. The wireless device 10, the processing circuitry 1101, and/or the beam tracking module 1102 may be configured to perform the beam tracking by performing measurements on reference signals for beams for the serving cell, and wherein the DL beam is selected based on the measured signal strength or measured signal quality on reference signals for respective beam.

The wireless device 10 may comprise a detecting module 1103, e.g. a receiver or a transceiver. The wireless device 10, the processing circuitry 1101, and/or the detecting module 1103 is configured to detect the beam failure process in the serving cell.

The wireless device 10, the processing circuitry 1101, and/or the detecting module 1103 may be configured to detect the beam failure process by detecting a PDCCH failure and/or downlink beam failure.

The wireless device 10 may comprise an initiating module 1104, e.g. a transmitter or a transceiver. The wireless device 10, the processing circuitry 1101, and/or the initiating module 1104 is configured to, in response to detection of the beam failure process, trigger the beam recovery process associated with the DL beam for the serving cell. The DL beam is selected based on the beam tracking performed prior to detecting the beam failure process. The beam recovery process may comprise to choose a downlink reference signal in the DL beam. The beam recovery process may comprise to send an uplink message to inform the radio network node of the DL beam of the chosen downlink reference signal. The beam tracking may comprise to collect in the wireless device 10 a snapshot and/or sample of a synchronization signal, SS, Block Burst or Burst Set, and/or a channel state information-reference signal of the one or more beams. The wireless device 10 may further store a quality of the one or more beams that will be filtered every measurement window period. The wireless device 10, the processing circuitry 1101, and/or the initiating module 1104 may be configured to, when a confirmation for the selected DL beam from the radio network node is lacking during a time window, transmit a request to access another beam being a second best beam according to the performed beam tracking.

The wireless device 10 may comprise a configuring module 1105. The wireless device 10, the processing circuitry 1101, and/or the configuring module 1105 may be configured to receive configuration data comprising a number of beams per cell to be possibly selected when beam failure is detected by the wireless device 10. E.g. receive configuration data from the first radio network node 12 which configuration data configured the wireless device 10 to perform the beam tracking of the best beams for a set of neighbour cells and/or candidate beams.

The wireless device 10 further comprises a memory 1106. The memory comprises one or more units to be used to store data on, such as RS configurations, mappings, beam tracking, mobility events, strengths or qualities, set of neighbour cells or beams, parameters, applications to perform the methods disclosed herein when being executed, and similar. The wireless device 10 further comprises a communication interface 1109 such as transmitter, receiver, transceiver and/or one or more antennas.

The methods according to the embodiments described herein for the wireless device 10 are respectively implemented by means of e.g. a computer program 1107 or a computer program product, comprising instructions, i.e., software code portions, which, when executed on at least one processor, cause the at least one processor to carry out the actions described herein, as performed by the wireless device 10. The computer program 1107 may be stored on a computer-readable storage medium 1108, e.g. a disc, a universal serial bus (USB) stick or similar. The computer-readable storage medium 1108, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium or a transitory computer-readable storage medium.

Thus, the wireless device may comprise the processing circuitry and the memory, said memory comprising instructions executable by said processing circuitry whereby said wireless device 10 is operative to perform the methods herein.

In embodiments herein the wireless device 10 may perform a DL beam selection on its serving cell to speed up beam recovery procedure where the wireless device 10 sends an UL message to inform the first radio network node which e.g. DL beams may be used to transmit to the wireless device 10 its DL control channel e.g. Physical Downlink Control Channel (PDCCH). If the embodiment is not implemented, the wireless device 10 would need to detect the beam failure e.g. based on narrow beamformed DL signals, such as CSI-RS, wait for the next occurrence of beam transmissions e.g. in an SS Block Set and, based on that DL reference transmits an UL message, e.g. a scheduling request on Physical Uplink Control Channel (PUCCH) or RACH preamble on PRACH. In any case beam recovery relies on the wireless device 10 detecting the best available DL beam as timing reference so the network, e.g. the first radio network node, can be detecting the right direction, e.g. with analog beamforming.

The proposed tracking for the serving cell in this embodiment for beam recovery occurs e.g. as follows: the L1 of the wireless device 10 collects a snapshot and/or sample of SS Block Burst and/or Burst Set and provide cell level quality to L3, also called the RRC (Radio Resource Control) protocol layer. The wireless device 10 may then store the values of the N best beams that will be filtered every measurement window period. These are constantly stored at the wireless device 10 and updated according to a beam-based filter, which could be configured by the network. When a beam failure process is detected, such as based on PDCCH failure and/or (narrow) DL beam failure, the wireless device 10 may try to choose a DL reference in a beam such as a wide beam or narrow beam. Thanks to beam tracking, immediately after the detection of beam failure the wireless device 10 can trigger the beam recovery i.e. without waiting for the next occurrence of an SS Block Set which may take 160 ms in some scenarios. At the network side e.g. the first radio network node 12, the detection of the UL signal allows the network to transmit in e.g. a wide beam the PDCCH for that wireless device 10 to either schedule data or confirm a successful recovery. The wireless device has knowledge of the N best beams, so if a confirmation is not received but expected during some kind of window (e.g. beam recovery RAR window) the wireless device 10 may transmit the request associated to the second best and so on.

It is herein below described a beam tracking process for neighbour cells, which can be any cell that is not the main serving cell e.g. primary cell (PCell) i.e. it can be other serving cells such as a Primary secondary cell (PSCell) or any configured Secondary cell (SCell) using a similar method as described above.

Figure 9:
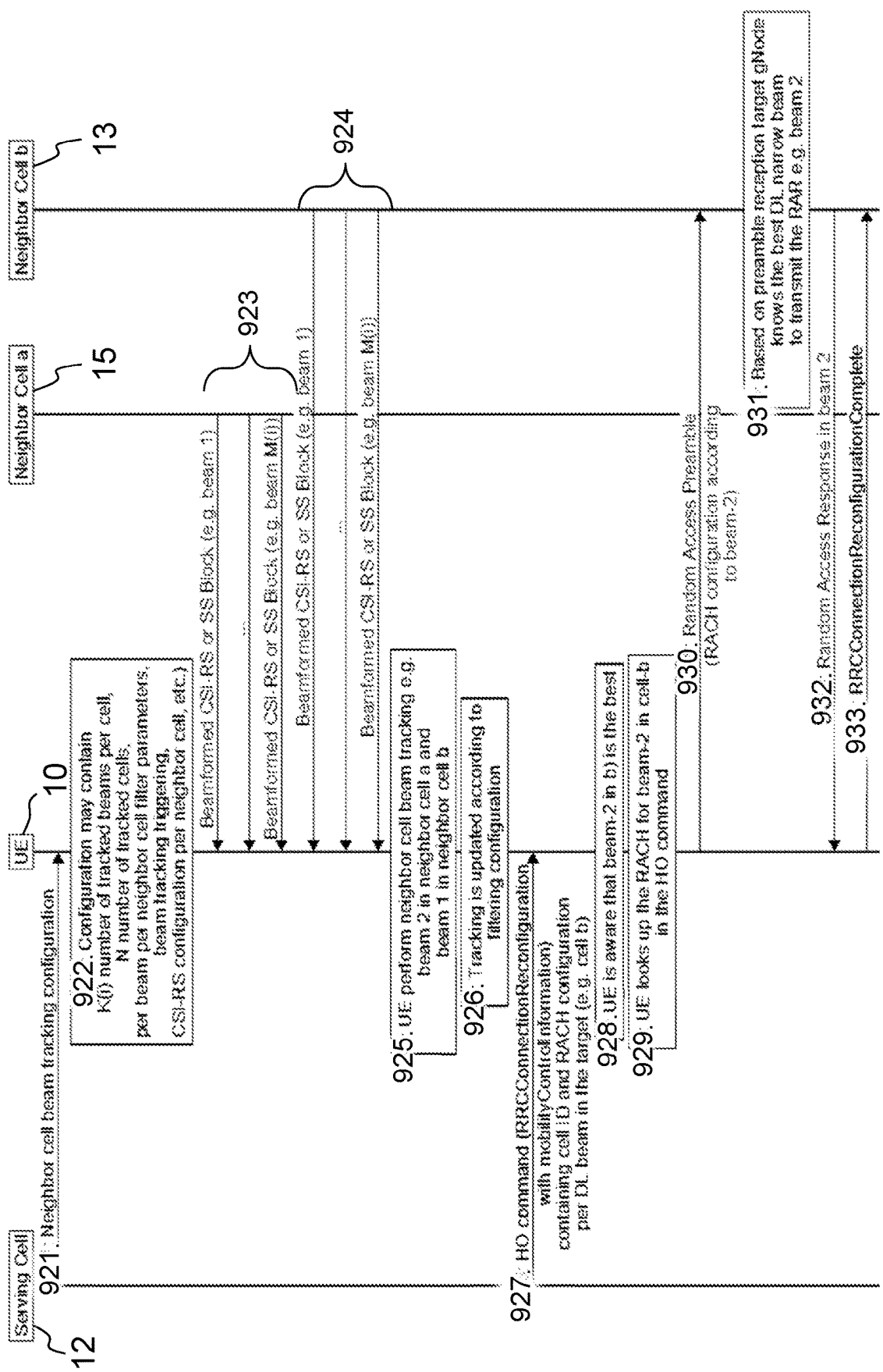
FIG. 9 is a schematic combined flowchart and signalling scheme.

FIG. 9 is a combined flowchart and signalling scheme.

Action 901. The first radio network node 12 may transmit a beam tracking configuration e.g. a neighbour cell beam tracking configuration, to the wireless device 10.

Action 902. The wireless device 10 may receive the beam tracking configuration and set up the wireless device for the beam tracking. The configuration may contain (or comprise) K(i) number of tracked beams per cell, N number of tracked cells, per beam per neighbour cell filter parameters, beam tracking triggering info, CSI-RS configuration per neighbour cell etc.

Action 903. The neighbour cell a, e.g. a third radio network node 15, may transmit beamformed CSI-RSs or SS blocks for respective beam (e.g. for beams 1 to M(i) of that neighbour cell).

Action 904. The neighbour cell b, e.g. the second radio network node 13, may transmit beamformed CSI-RSs or SS blocks for respective beam (e.g. for beams 1 to M(i) of that neighbour cell, e.g. service area 14).

Action 905. The wireless device 10 performs beam tracking (neighbour cell beam tracking) e.g. beam 2 in neighbour cell a and beam 1 in neighbour cell b. For example, measures signal strength or quality of CSI-RSs or SS blocks for respective beam.

Action 906. The wireless device 10 continues with the beam tracking updated according to e.g. the filtering configuration.

Action 907. The first radio network node 12 transmits a handover command to the wireless device 10 indicating a neighbour cell to handover to. E.g. the first radio network node 12 transmits RRCConnectionReconfiguration with mobilityControlInformation containing Cell ID and RACH configuration (e.g. preamble, time and frequency) per DL beam in the neighbour/target cell, e.g. cell b.

Action 908. The wireless device 10 is aware that beam 2 in cell b is the best from the beam tracking.

Action 909. The wireless device 10 looks up or selects the RACH configuration for beam 2 in neighbour cell b from e.g. the HO command.

Action 910. The wireless device 10 transmits a random access preamble or RACH preamble to the second radio network node 13 based on the RACH configuration according to or for beam 2.

Action 911. The second radio network node 13 selects the beam of the RACH configuration. That is, based on the preamble reception the second radio network node 13 such as a target gNodeB knows the best DL narrow beam to transmit e.g. a random access response (RAR) on e.g. beam 2.

Action 912. The second radio network node 13 transmits the RAR in beam 2 to the wireless device 10.

Action 913. The wireless device 10 may then transmit an RRCConnectionReconfiguration complete to the second radio network node 13.

Furthermore, below is it described examples of a HO process:
- a Tracking process, including potential triggers to reduce the number of measurements needed, see e.g. action 1003;
- Reference signals that could be used for tracking, see e.g. action 1002;
- Wireless device actions upon receiving the HO command (or equivalent) with the mapping between RACH and the DL beam in the target, see e.g. action 1005.
- A SON function and report associated to the SON function
- Potential network signalling/configuration for the wireless device actions, see e.g. action 1001.

Figure 10:
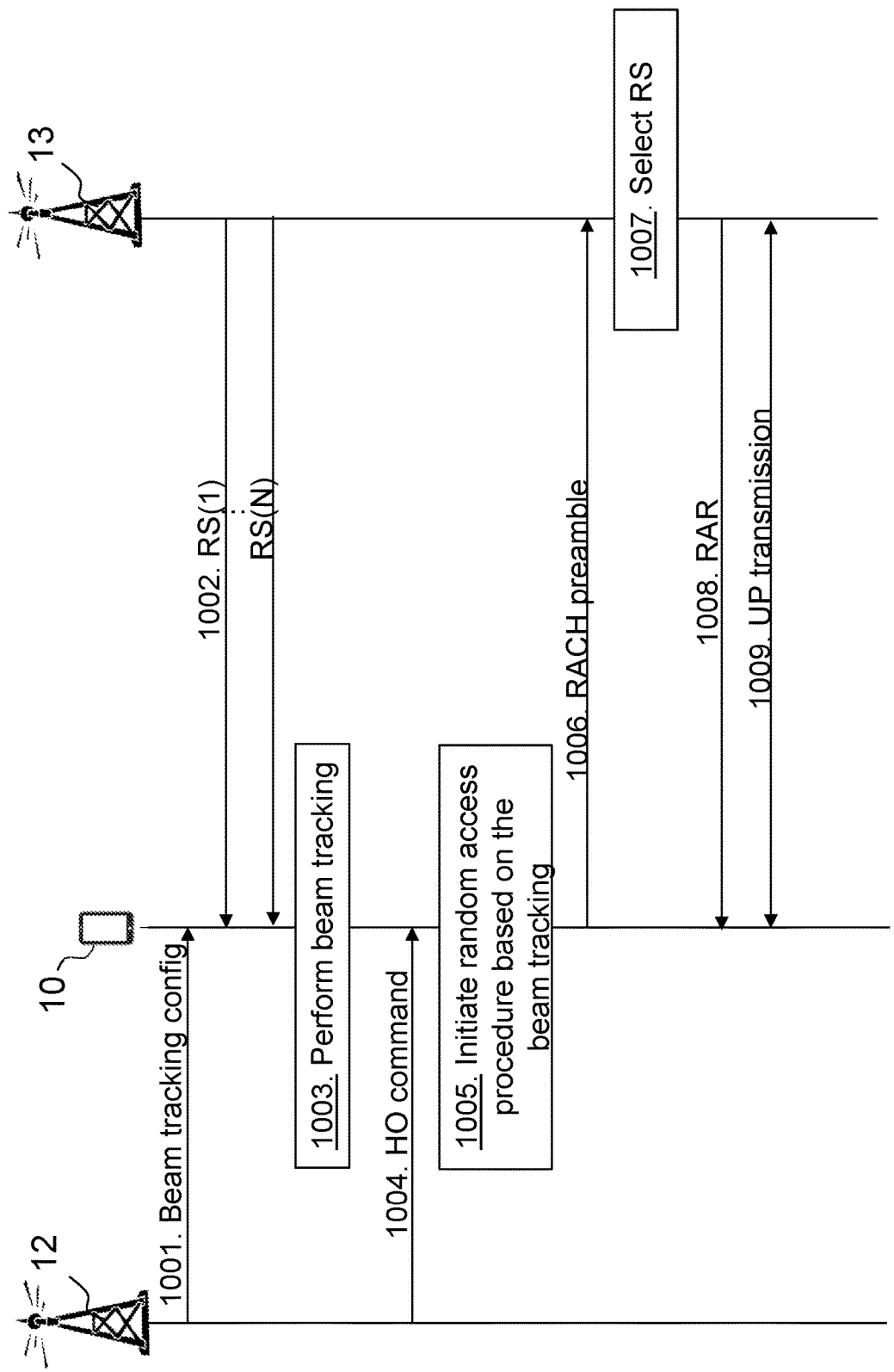
FIG. 10 is a schematic combined flowchart and signalling scheme.
Figure 11:
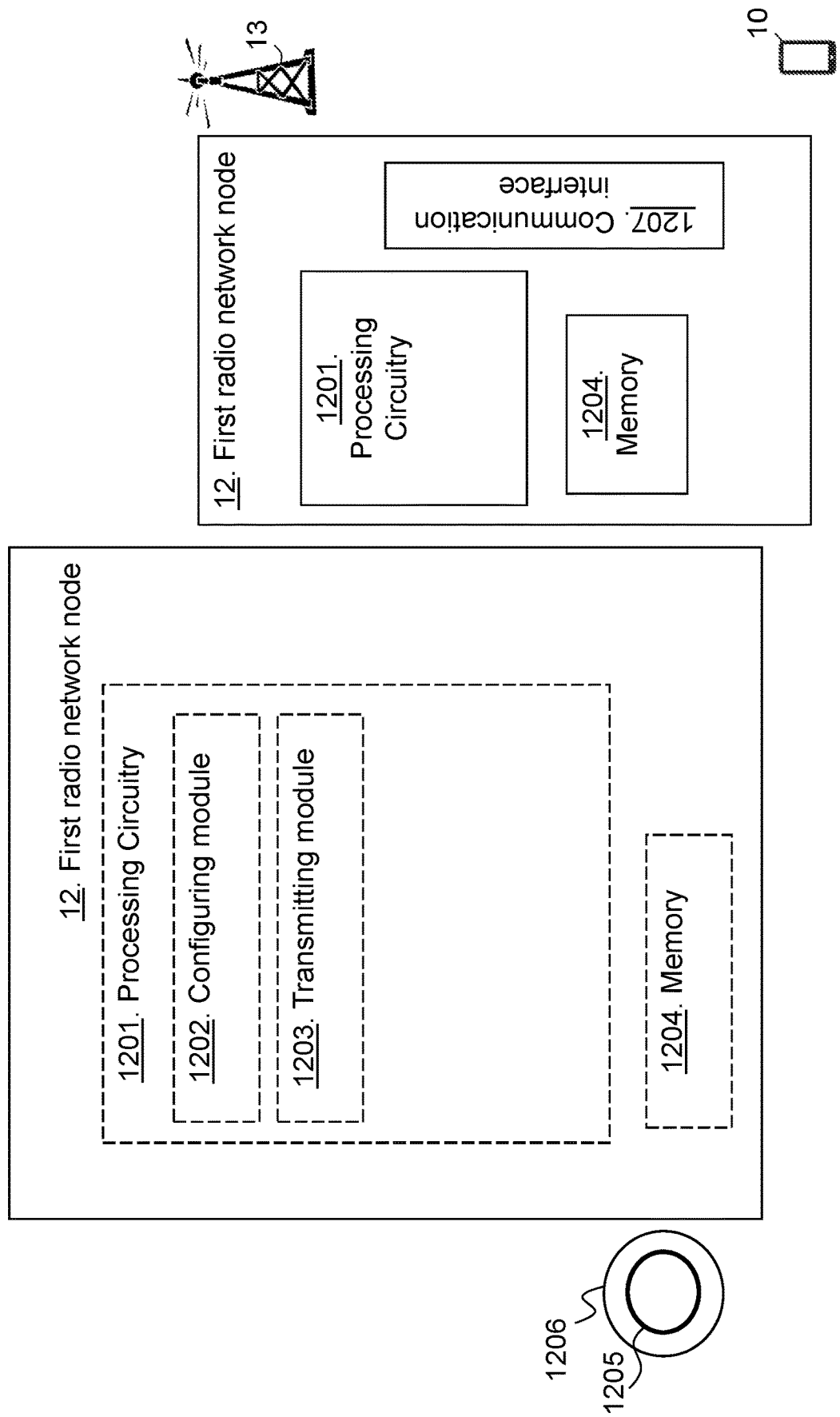
FIG. 11 is a block diagram depicting a radio network node.

FIG. 10 is a schematic combined flowchart and signalling scheme for a HO process. The first radio network node is serving the wireless device 10 in the wireless communication network further comprising the second radio network node.

Action 1001. The first radio network node 12 may transmit an indication to the wireless device 10 indicating a set of candidate neighbouring cells. That is, the first radio network node may configure the wireless device with a set of candidates neighbouring cells. The first radio network node 12 may further configure beam-specific tracking filter parameters such as the number of snapshots per evaluation periods e.g. 40 ms snapshots within 200 ms.

The first radio network node 12 may also configure the wireless device 10 with a number K of best beams to track per neighbour candidate. The first radio network node 12 may also have K(i) as a function of specific neighbour cells i.e. for some candidates the wireless device 10 would track more beams than for some other neighbour cells. That can be useful, for example, in the case there is a limitation in the maximum number of beams that could be tracked and the first radio network node 12 is aware of a more likely neighbour cell candidate then the wireless device 10 may possibly monitor more beams of this candidate than for another neighbour cell candidate.

The first radio network node 12 may also configure the wireless device 10 with a number M best cells to perform beam tracking. In other words, if the wireless device 10 detects a maximum number of cells, only a subset of these would be candidates for beam tracking.

The first radio network node 12 may also configure the wireless device 10 to use this or not, even in a cell basis. That may depend on the network knowledge about the periodicity the signals are being transmitted and/or the usage of beamforming in the neighbour cells.

The first radio network node 12 may also configure the wireless device 10 to use a given reference signal or sets of reference signals for the feature. For example, as described above, the wireless device 10 could be configured with the CSI-RS for the tracking and/or signal(s) in the SS Block such as PSS, SSS, TSS and/or DMRS for PBCH.

Action 1002. The second radio network node 13 transmits its beams, i.e. the second radio network node 13 transmits reference signals (RS) associated with a respective beam, e.g. PSS, SSS, TSS, DMRS, CSI-RS, BRS, or similar.

Action 1003. The wireless device 10 performs beam tracking of the N best beams of a set of detected neighbour cell candidates. The wireless device 10 may track, repeatedly measure on the reference signals transmitted from the network node, a number of beams over a set time interval. The beam tracking may be performed in a different time scale compared to the measurements used for RRM purposes i.e. to trigger mobility events to support mobility, carrier aggregation, dual connectivity, inter-RAT dual connectivity (LTE/NR tight interworking) procedures.

The tracking process can be performed as a filtering process, which could either be configured by the network or done via wireless device implementation. The wireless device 10 may collect snapshots of the RSs transmitted in DL beams by the neighbour cell candidates and may perform coherent and non-coherent averages per beams. The N best beams per snapshot may be detected based e.g. on peaks in the Signal to Interference plus Noise Ratio (SINR) and identified via some implicit or explicit beam identification in the RS (e.g. time/frequency resources or even some identifier e.g. TSS). For the beam tracking purpose, the snapshot may not combine beam values with each other but instead separate them. The N best beams are the instantaneous beam values at time t(n−1).

Subsequent snapshots could be taken, e.g. not far apart from each other. The wireless device 10 may collect multiple samples of the same beam in the target cell and possibly combine them to form some average per beam SINR or Reference Signal Received Power (RSRP). If N varies from one snapshot to another the wireless device 10 may discard or at least separate beams with less samples. In the case subsequent samples are used, the timing may be different compared to the timing used for the cell level measurements since for the snapshots need to be much closer in time otherwise these will be outdated measurements at the moment of the handover.

The wireless device 10 may constantly perform this tracking process for each detected neighbour cell (or explicitly configured neighbour cell by the first radio network node). The wireless device 10 may perform the beam tracking right after detecting that a given cell is a neighbour cell candidate. The advantage of triggering the beam tracking even before any report is transmitted is that the network may trigger blind/semi-blind handovers or blind/semi-blind establishment of dual connectivity/carrier aggregation/tight interworking with LTE via dual connectivity i.e. at that time the wireless device 10 would already have these per beam measurements. Alternatively, the wireless device 10 may start the beam tracking (tracking process) only after triggering one of the configured mobility events (such as events similar to the events A1, A2, . . . , A6 in LTE) or after sending one of these in measurement reports. That may relax the wireless device 10 constraint to not have to perform per beam measurements and store them.

The wireless device 10 may be configured with a special mobility event that triggers the wireless device 10 to initiate per beam measurements. The special mobility events may be a conditional event i.e. only triggered after one of the mobility events like events A1, A2, . . . , A6 in LTE are triggered. Alternatively, that is simply done via threshold adjustment/alignment of the events.

The wireless device 10 may be configured by the first radio network node 12 to initiate the beam tracking for a set of specific target cells (possibly previously reported as good candidates or known by the first radio network node 12 as possibly detectable by the wireless device 10).

The beam tracking or tracking procedure may also contain aspects related to the beamforming of the wireless device 10, both in terms of wireless device reception beamforming to detect the strongest DL beam or/and wireless device transmission beamforming to transmit the RACH preamble associated to the strongest/best DL beam in the target. For example, the wireless device 10 may perform a full sweep of its Reception (Rx) beamforming before selecting the best beam in each target candidate cell. That may provide additional information, especially in the case the measurements per beam have low SINR. The wireless device 10 may use the additional information to improve its PRACH preamble transmission i.e. to send the equivalent direction. This would be a tracking of the best Transmission (Tx) beam of the wireless device 10 to transmit the RACH in the target.

Other potential triggers of the beam tracking may be related to the wireless device movements or wireless device speed where beam tracking becomes even more important.

The wireless device 10 may perform beam tracking on always on/periodic reference signals that are transmitted in DL beam by the neighbour cells. These could be any signal in the SS Block, such as the PSS, the SSS, the TSS and/or DMRSs defined for the PBCH demodulation. In that case, the neighbour cell identification may be done via the PSS and/or SSS, while the TSS may be used to distinguish the beams, if subsequent snapshots are needed.

The wireless device 10 perform beam tracking on, in addition and/or instead, CSI-RSs. These CIS-RSs may be configured per neighbour cell e.g. after measurement reports are transmitted by the wireless device 10 indicating the best cells. In the case the wireless device 10 reports best beams per cell (e.g. based on the long term averages done per cell) the network can use that information to trigger narrow CSI-RS beams to be monitored instead of a full sweep for the target cell candidates. The wireless device 10 may be aware of the CSI-RS transmissions in the target cell, e.g. the time/frequency resources that are transmitted, the bandwidth, sequences to search for, etc.). That could have been previously configured by the network as part of the measurement configuration in the serving cell.

Action 1004. The first radio network node 12 may decide to request a handover for the wireless device 10 (or a set of wireless devices) to a specific candidate target service area associated to the second radio network node 13. The first radio network node 12 then transmits, to the wireless device 10, a handover command or a message indicating a handover of the wireless device to the second radio network node 13.

Action 1005. Upon receiving the handover command, e.g. RRCConnectionReconfiguration with mobilityControlInformation or equivalent, such as RRCReconfiguration with synchronization indication, secondary cell group (SCG) change, SCG addition, etc., that is to be used to trigger a handover or the establishment of a secondary cell, the wireless device uses the result of the beam tracking (up to date information) to initiate random access procedure with the target, i.e. the second radio network node 13, without necessarily waiting to perform additional measurements to select the best DL beam to map to its configured RACH resources.

The wireless device 10 has up to date information about the best DL beam for a set or subset of the neighbour cells. If the target cell indicated in the HO command is within the set of the neighbour cells for which the wireless device 10 has up to date measurements concerning the best beam (where up to date can be defined by the network or via implementation, although that may probably be defined as some time elapsed from the latest snapshot to the time the HO command is received) and the best beam is in a list of allowed beams for the target (jointly with the RACH configuration per beam) the wireless device 10 may initiate a random access procedure to the radio network node associated with the best beam by sending a preamble in the HO command per DL matching the best beam. In other words, the wireless device 10 may send the configured preamble in the time-frequency resources matching the best DL beam in the target cell based on the performed beam tracking.

If the target cell indicated in the HO command is within the set of the neighbour cells for which the wireless device 10 has up to date measurements concerning the best beam (where up to date can be defined by the network or via implementation, although that would be some time elapsed from the latest snapshot to the time the HO command is received) but the best beam is not in the list of allowed beams for the target (jointly with the RACH configuration per beam) the wireless device 10 may check the availability of the second best beam associated to that target. Notice that availability may depend whether the wireless device 10 has performed measurement for the best or also for the other K−1 best beams per target. On the network side, K best beams for tracking could have been configured when it is known that target cells might be overloaded so that it is might be good if the wireless device 10 has some alternative beams to access. If the HO command contains one of the tracked K−1 best beams the wireless device 10 initiates a random access procedure assuming that one as the best beam by sending a preamble in the HO command per DL matching the best beam. In other words, the wireless device 10 may send the configured preamble in the time-frequency resources matching the k-th best DL beam in the target cell based on the tracking depending on the availability of measurements.

If the target cell indicated in the HO command is within the set of the neighbour cells for which the wireless device 10 has up to date measurements concerning the best beam (where up to date can be defined by the network or via implementation, although that would be some time elapsed from the latest snapshot to the time the HO command is received) but is any of the available k-th best beam in the list of allowed beams for the target (jointly with the RACH configuration per beam) the wireless device 10 may trigger a fallback procedure and wait to select the best beam in the target cell before initiating random access.

If the target cell indicated in the HO command is not within the set of the neighbour cells for which the wireless device 10 has up to date measurements concerning the best beam (where up to date can be defined by the network or via implementation, although that would be some time elapsed from the latest snapshot to the time the HO command is received) then the wireless device 10 triggers the fallback procedures as described in the previous paragraph i.e. wait to select the best beam in the configured target cell before initiating random access. In that particular case synchronization may be needed.

Action 1006. The wireless device then sends the RACH preamble to the second radio network node 13 e.g. transmit the configured preamble in the time-frequency resources matching the best DL beam in the target cell based on the performed beam tracking.

Action 1007. Upon the reception of the RACH preamble in the time/frequency resource that maps to a given DL beam, the second radio network node 13 detects what is the strongest DL narrow beam covering the wireless device 10.

Action 1008. The second radio network node 13 may then respond to the wireless device with a random access response (RAR) to the wireless device 10. This may be transmitted using the detected beam or another beam.

Action 1009. The second radio network node 13 may then perform user plane (UP) communication (DL or UL) with the wireless device 10 using the narrow beam associated with the RACH configuration of the random access procedure performed by the wireless device 10.

Thus, the wireless device 10 may track beams of the target neighbour cell candidates to improve the handover performance in terms of latency.

It is herein also disclosed an example of a possible Self Organizing Network (SON) function to optimize the procedure.

SON function and reporting associated to the SON function

In the fallback case, e.g. when the target cell indicated in the HO command is not within the set of the neighbour cells mentioned in action 1005, the wireless device 10 may have been previously configured by the network to store the information that a "failure" has occurred i.e. none of the best beams were in the subset allowed by the target. That may be reported in the HO complete message, or equivalent in the case of dual connectivity (DC), in the target and forwarded to the serving cell (via an inter-node interface like Xn in NR). That can be used as an input to SON functions so in future configurations the serving and target cells may allow that beam to be accessed and/or trigger the CSI-RS beams associated to that best beam(s) in the target(s). That failure report may also be requested by the network e.g. a network node such as a MME or similar, after the wireless device 10 is connected to the second radio network node 13.

The report may be stored at least in one of these two cases, with the following information:

HO command contains a cell that was not in the set such as a list of neighbour cells on which the wireless device 10 was performing beam tracking; in that case the report may contain the target cell ID, the serving cell ID, the beams tracked in each neighbour candidate and their RSRP (or equivalent) values.

HO command contains a cell that was in the list the wireless device 10 was performing neighbour cell beam tracking however, any of the beams tracked for that neighbour cell were in the allowed list of accessible beams. In that case, the wireless device 10 stores and reports target cell ID, the serving cell ID, the beams tracked in each neighbour candidate and their RSRP (or equivalent) values. Other information is not precluded.

A single report may be reported but there could be different reports for the different failures.

The purpose of these reports could be to either allow the network such as the network node to activate more beams for certain targets in the future, enable target cells to trigger specific DL beams to transmit CSI-RS to assist CSI-RS based handovers and/or RRM measurements (on demand), etc.

Figure 12:
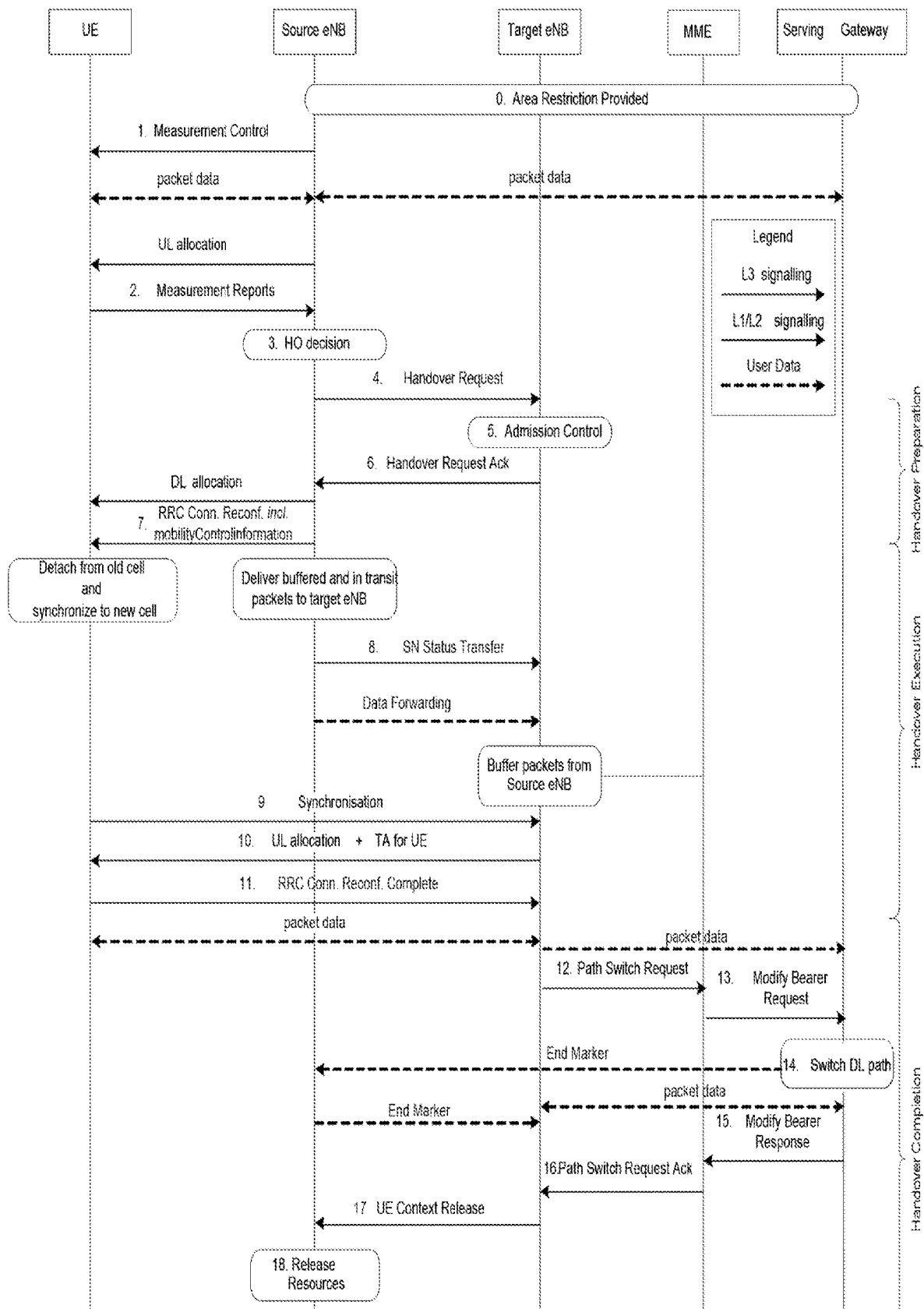
FIG. 12 shows a handover process in LTE.

FIG. 12 is a block diagram depicting two examples of the first radio network node 12 according to embodiments herein for handling communication of the wireless device in the wireless communication network. The first radio network node 12 is configured to serve the wireless device 10 and the wireless communication network 1 further comprises the second radio network node 13.

The first radio network node 12 may comprise processing circuitry 1201, e.g. one or more processors, configured to perform the methods herein.

The first radio network node 12 may comprise a configuring module 1202, e.g. a transmitter or a transceiver. The first radio network node 12, the processing circuitry 1101, and/or the configuring module 1202 is configured to transmit configuration data to the wireless device 10. The configuration data indicates that the wireless device 10 is to perform beam tracking of one or more best beams of the set of detected neighbour cells.

The first radio network node 12 may comprise a transmitting module 1203, e.g. a transmitter or a transceiver. The first radio network node 12, the processing circuitry 1101, and/or the transmitting module 1203 may be configured to transmit the indication, the handover command, to the wireless device 10.

The first radio network node 12 further comprises a memory 1204. The memory comprises one or more units to be used to store data on, such as RS configurations, mappings, indications, messages, set of neighbour cells, strengths or qualities, parameters, applications to perform the methods disclosed herein when being executed, and similar. The first radio network node 12 may further comprise a communication interface 1207 comprising a transmitter, a receiver, a transceiver and/or one or more antennas.

The methods according to the embodiments described herein for the first radio network node 12 are respectively implemented by means of e.g. a computer program 1205 or a computer program product, comprising instructions, i.e., software code portions, which, when executed on at least one processor, cause the at least one processor to carry out the actions described herein, as performed by the first radio network node 12. The computer program 1205 may be stored on a computer-readable storage medium 1206, e.g. a disc, a USB stick, or similar. The computer-readable storage medium 1206, having stored thereon the computer program, may comprise the instructions which, when executed on at least one processor, cause the at least one processor to carry out the actions described herein, as performed by the first radio network node 12. In some embodiments, the computer-readable storage medium may be a non-transitory computer-readable storage medium.

Thus, the first radio network node 12 may comprise the processing circuitry and the memory, said memory comprising instructions executable by said processing circuitry whereby said radio network node is operative to perform the methods herein.

In the following, the mobility in LTE and in particular the handover preparation between radio network nodes, denoted as eNodeBs (eNB), is described.

In LTE, the handover of a wireless device in RRC_CONNECTED state is a wireless device-assisted network-controlled Handover (HO), with HO preparation signalling in E-UTRAN:

Part of the HO command comes from the target eNB and is transparently forwarded to the wireless device by the source eNB see actions 6 and 7;

To prepare the HO, the source eNB passes all necessary information to the target eNB (e.g. E-Radio Access Bearer (RAB) attributes and RRC context) see action 8;

Both the source eNB and the wireless device keep some context, e.g. Cell-Radio Network Temporary Identifier (C-RNTI), to enable the return of the wireless device in case of HO failure;

The wireless device accesses the target cell via random access channel (RACH) following a contention-free procedure using a dedicated RACH preamble or following a contention-based procedure if dedicated RACH preambles are not available; the wireless device uses the dedicated preamble until the handover procedure is finished (successfully or unsuccessfully), see action 9;

If the RACH procedure towards the target cell is not successful within a certain time, the wireless device initiates radio link failure recovery using a suitable cell;

No robust header compression (ROHC) context is transferred at handover;

ROHC context may be kept at handover within the same eNB.

Figure 1:
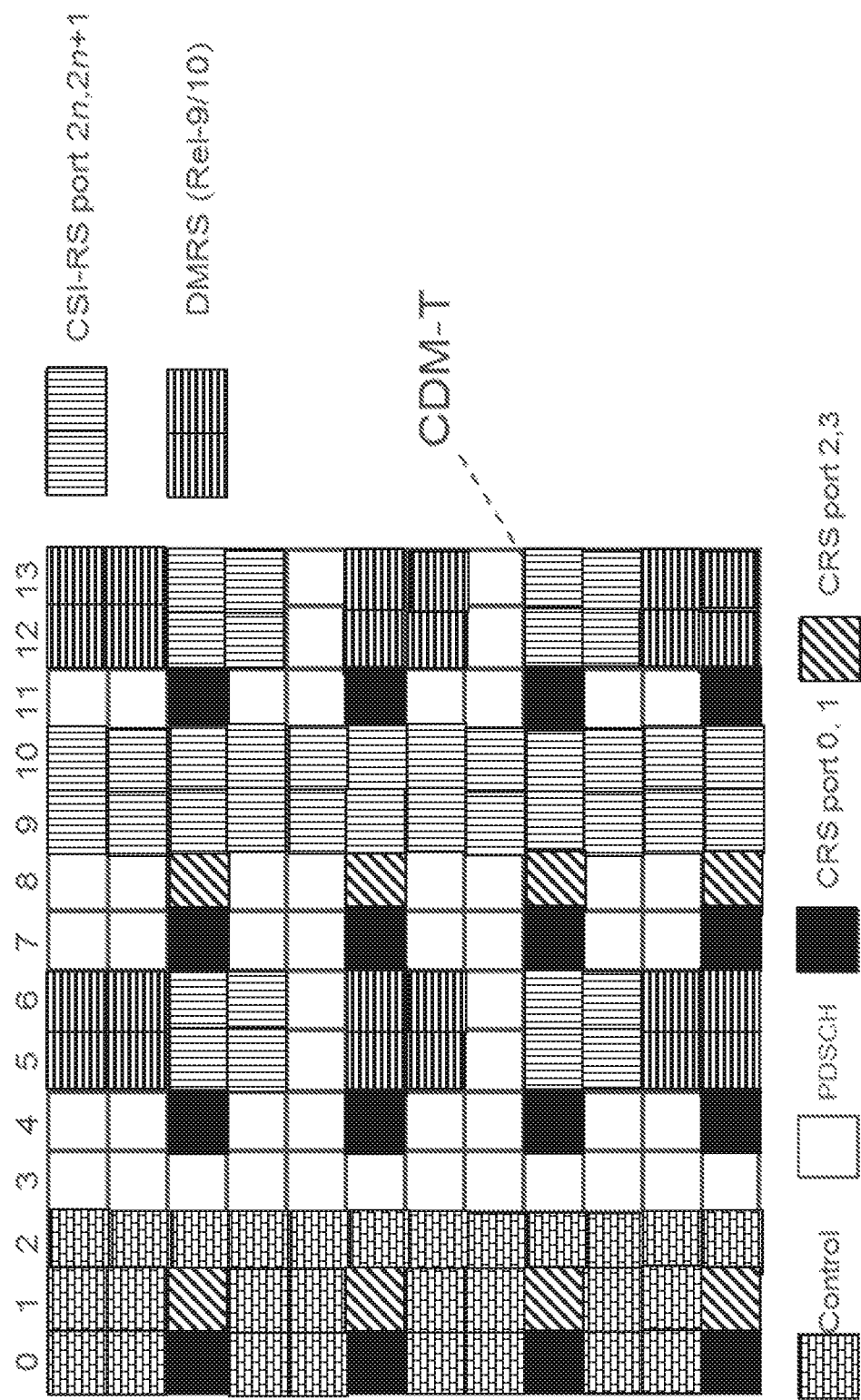
FIG. 1 shows CSI-RS resource allocation for a given subframe and resource block.
Figure 2:
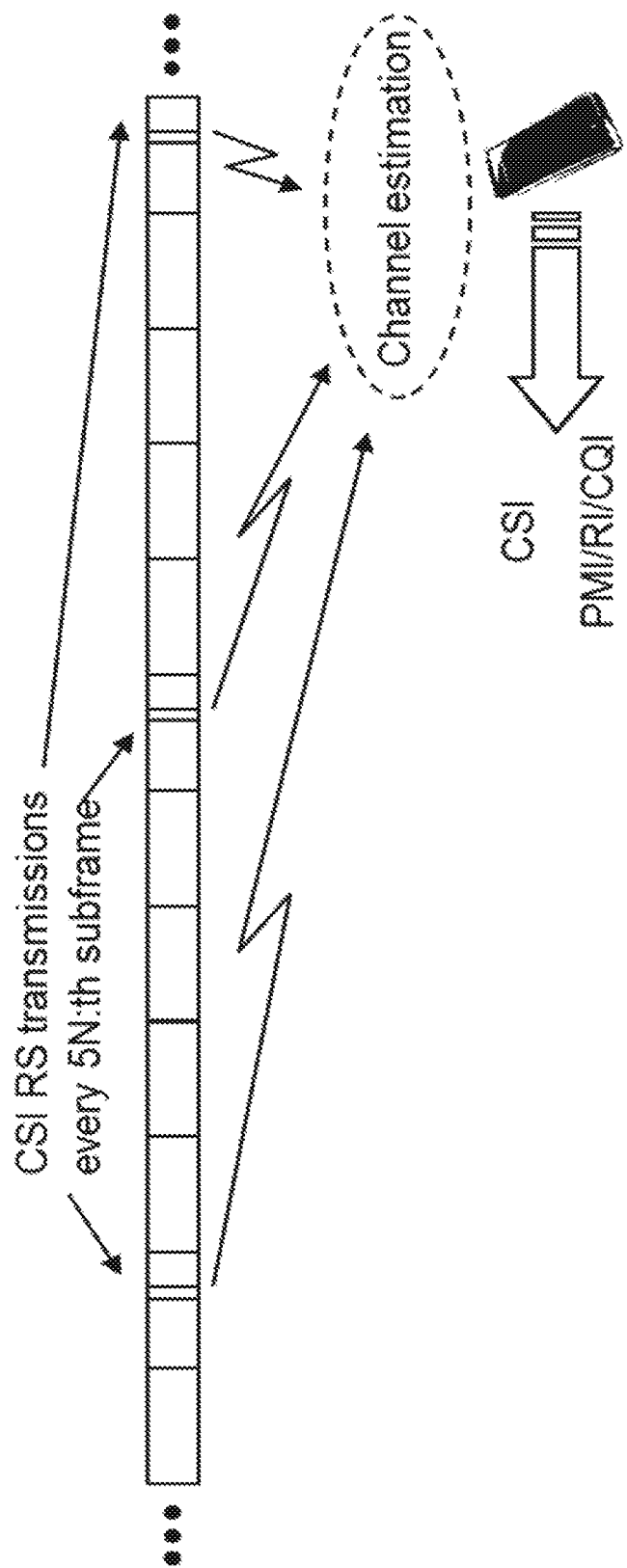
FIG. 2 shows channel estimation of CSI-RS transmissions.
Figure 3:
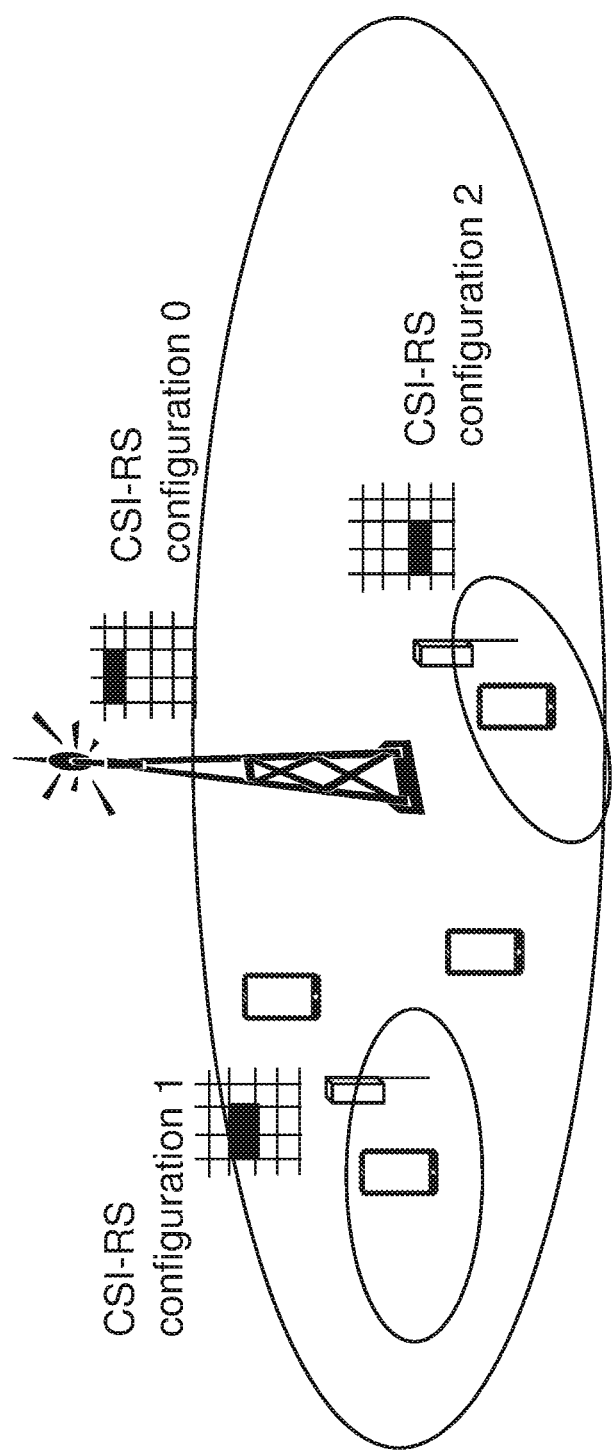
FIG. 3 shows CSI-RS resource allocation across multiple coordinated cells.
Figure 4:
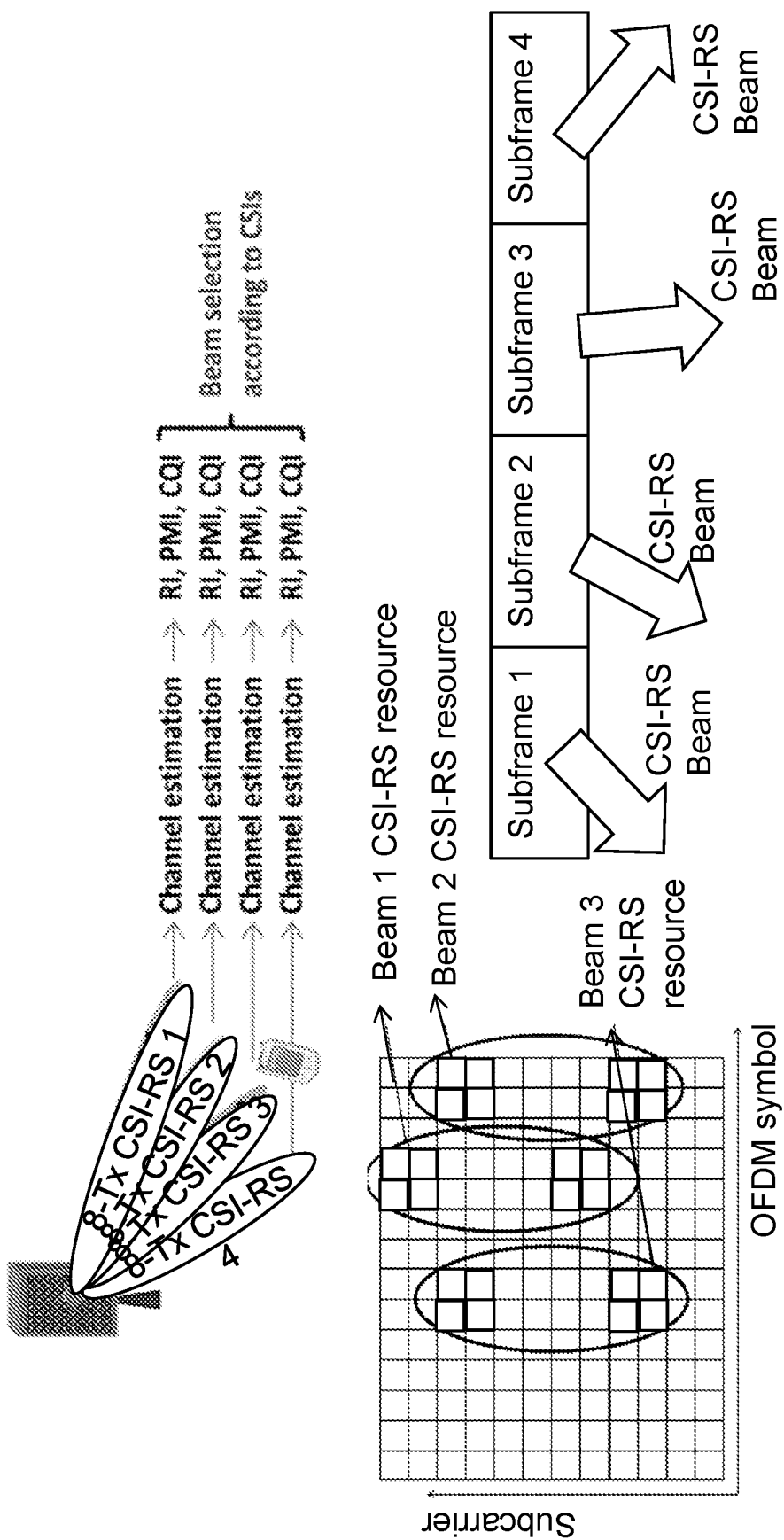
FIG. 4 shows CSI-RS support for beam selection in LTE.
Figure 5:
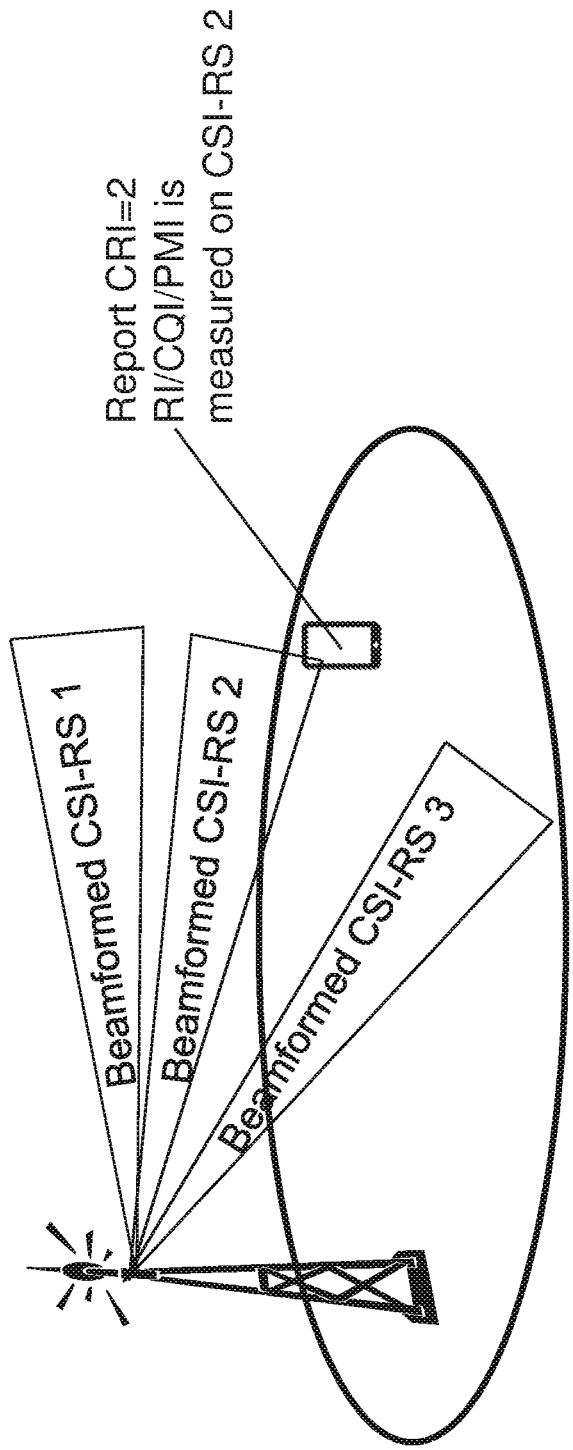
FIG. 5 shows beamformed CSI-RS in LTE.
Figure 7:
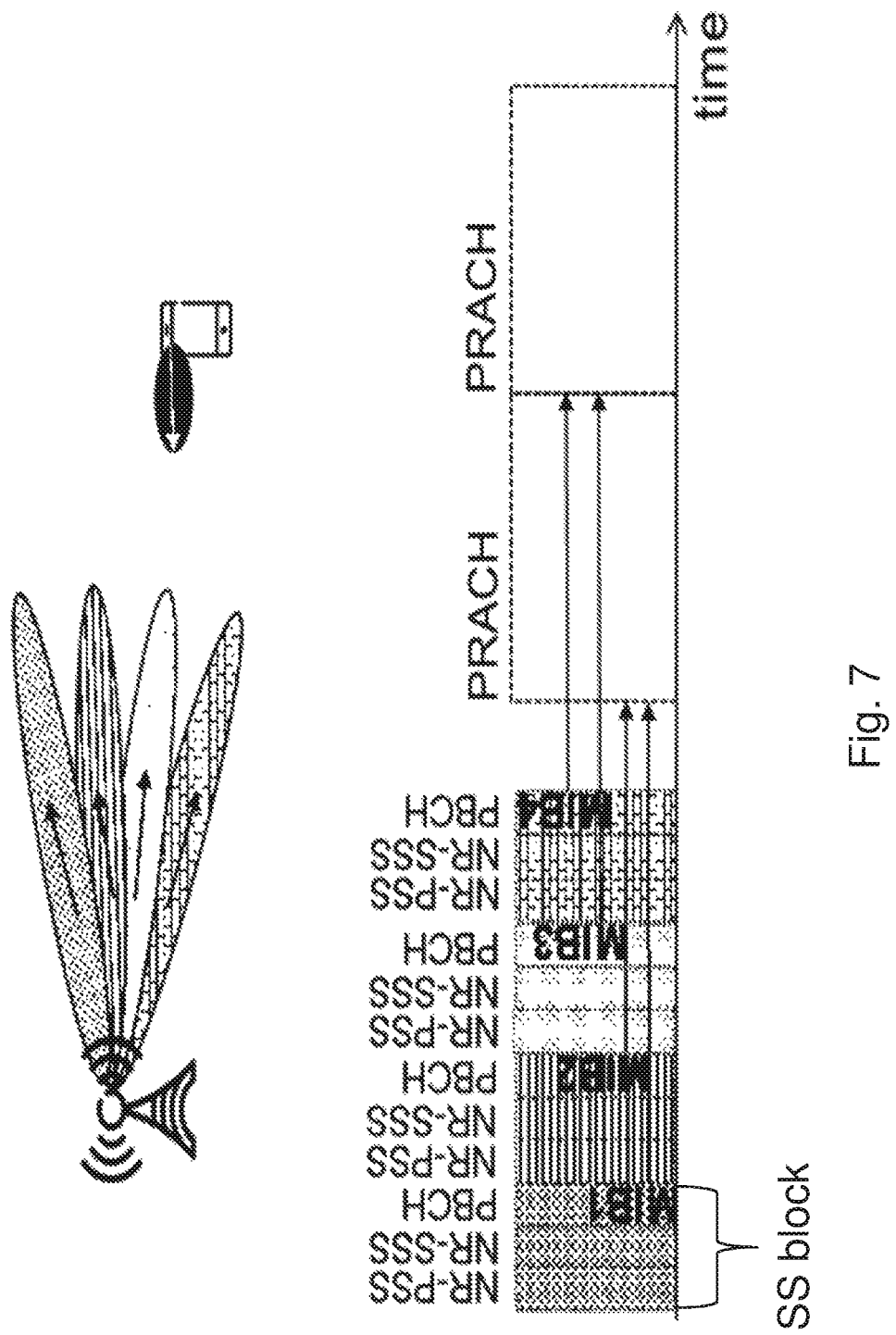
FIG. 7 shows that each SS Block contains a mapping between RACH configuration and the strongest DL beam transmitting the SS Block. In this example, each PRACH occasion/resource is associated with two SS Block beams.

The preparation and execution phase of the HO procedure is performed without CN involvement, e.g. EPC in the case of LTE, i.e. preparation messages are directly exchanged between the eNBs. The release of the resources at the source side during the HO completion phase is triggered by the eNB. The FIG. 7 depicts the basic handover scenario where neither mobility management entity (MME) nor Serving Gateway changes: Handover preparation in LTE is further described i.e. actions 3, 4, 5 and 6 in FIG. 7. The Handover preparation is initiated by the serving eNodeB that makes decision for a handover, action 3, possibly based on MEASUREMENT REPORT and RRM information to hand off the wireless device. Then the follow steps occur:

Action 4: The source eNB issues a HANDOVER REQUEST message to the target eNB passing necessary information to prepare the HO at the target side (wireless device X2 signalling context reference at source eNB, wireless device S1 EPC signalling context reference, target cell ID, KeNB, RRC context including the C-RNTI of the wireless device in the source eNB, access stratum (AS)-configuration, enhanced radio access bearer (E-RAB) context and physical layer ID of the source cell+short medium access control (MAC)-I for possible radio link failure (RLF) recovery). Wireless device X2 signalling and/or wireless device S1 signalling references enable the target eNB to address the source eNB and the EPC. The E-RAB context includes necessary radio network layer (RNL) and transport network layer (TNL) addressing information, and quality of service (QoS) profiles of the E-RABs.

Action 5: Admission control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

Action 6: The target eNB prepares HO with Layer 1 (L1) and/or Layer 2 (L2) and sends the HANDOVER REQUEST ACKNOWLEDGE to the source eNB. The HANDOVER REQUEST ACKNOWLEDGE message includes a transparent container to be sent to the wireless device as an RRC message to perform the handover. The container includes a new C-RNTI, target eNB security algorithm identifiers for the selected security algorithms, and may include a dedicated RACH preamble, and possibly some other parameters i.e. access parameters, System Information Blocks (SIB), etc. The HANDOVER REQUEST ACKNOWLEDGE message may also include RNL and/or TNL information for the forwarding tunnels, if necessary.

NOTE: As soon as the source eNB receives the HANDOVER REQUEST ACKNOWLEDGE (ACK), or as soon as the transmission of the handover command is initiated in the downlink, data forwarding may be initiated.

A similar inter-node signalling as in LTE may be assumed as baseline for upcoming generations of telecommunications. Hence, it is expected a similar Xn signalling exchanged between radio network nodes, denoted as gNodeBs in NR, i.e. a Handover Request from serving to target, followed by a Handover Request ACK once admission control occurs in the target.

Thus, in LTE, a handover occurs from the serving cell to the neighbour cell. In order to assist the network, the wireless device is configured to perform RRM measurements for its own cell and compare with the quality of neighbour cells. In other words, the wireless device needs to measure the quality of neighbour cell, report these to the radio network node so a decision can be made.

The radio network node may decide to handover the wireless device from a serving cell to possibly one of the neighbour cell candidates that have been reported. Then, the handover command follows, in LTE this is the RRCConnectionReconfiguration with the IE mobilityControlInformation, containing among other parameters the RACH configuration the wireless device should use to access the target cell such as the physical random access channel (PRACH) time and frequency resources the wireless device should transmit the preamble (possibly also dedicated and allocated in the same message).

Since handover is a costly procedure in terms of radio signalling, and, in some cases (inter-gNodeB i.e. between nNodeBs) network signalling, too frequent handovers and ping-pong handover should be avoided or at least minimized, especially because they may also increase the chances of failure. In addition, for battery saving reasons and load, too frequent measurement reports should be avoided or minimized. Hence, event-triggered reports based on filtered measurements are defined per cell in LTE. There may be requirements on e.g. evaluation period of 200 ms for a certain accuracy and wireless device implementation typically picks a snapshot of 40 ms to perform some coherence and on-coherent average over time and frequency.

It is herein disclosed a method performed by a wireless device for handling communication of the wireless device in a wireless communication network. A first radio network node serves the wireless device and the wireless communication network further comprises a second radio network node. The wireless device performs a beam tracking of one or more best beams for (or of) a set of detected neighbour cells (candidates). The wireless device further receives an indication, e.g. a handover command, from the first radio network node, which indication indicates a handover of the wireless device to a neighbour cell. When the neighbour cell is in the set of detected neighbour cells, the wireless device initiates a random access procedure associated with the best beam according to the beam tracking for that neighbour cell.

It is herein disclosed a method performed by a first radio network node for handling communication of a wireless device in a wireless communication network. The first radio network node serves the wireless device and the wireless communication network further comprises a second radio network node. The first radio network node transmits configuration data i.e. configures the wireless device with data, which data indicates that the wireless device is to perform beam tracking of one or more best beams for (or of) a set of detected neighbour cells.

The wireless device may perform beam tracking of N best beams of/from a set of detected neighbour cell candidates. That can be performed in a different time scale compared to the measurements used for RRM purposes i.e. to trigger mobility events to support mobility, carrier aggregation, dual connectivity, inter-RAT dual connectivity (LTE/NR tight interworking) procedures.

Upon receiving the indication such as the handover command (e.g. RRCConnectionReconfiguration with mobilityControlInformation or equivalent), that is to be used to trigger a handover or the establishment of a secondary cell, the wireless device uses up to date information from the beam tracking to initiate random access procedure with the second radio network node, without necessarily waiting to perform additional measurements to select the best DL beam to map to its configured RACH resources.

Furthermore, a first radio network node and a wireless device configured to perform the methods herein are also provided.

It is herein also provided a computer program comprising instructions, which, when executed on at least one processor, causes the at least one processor to carry out the methods herein, as performed by the first radio network node or the wireless device. Furthermore, it is herein provided a computer-readable storage medium, having stored thereon a computer program comprising instructions which, when executed on at least one processor, cause the at least one processor to carry out the methods herein, as performed by the first radio network node or the wireless device.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc, Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE Frequency Division Duplex/Time Division Duplex (FDD/TDD), WCDMA/HSPA, GSM/GERAN, Wi Fi, WLAN, CDMA2000 etc.

Antenna node is a unit capable of producing one or more beams covering a specific service area or direction. An antenna node can be a base station, or a part of a base station.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method performed by a wireless device for handling communication of the wireless device in a wireless communication network, wherein the wireless device is served by a radio network node in a serving cell, the method comprising:
    performing a beam tracking of the serving cell for tracking one or more beams of the serving cell based on measured signal strength or measured signal quality, wherein the beam tracking comprises collecting in the wireless device a snapshot and/or sample of a synchronization signal, SS, Block Burst or Burst Set;
    detecting a beam failure process in the serving cell;
    in response to detection of the beam failure process, triggering a beam recovery process associated with a downlink, DL, beam for the serving cell, wherein the DL beam is selected based on the beam tracking performed prior to detecting the beam failure process; and
    when a confirmation for the selected DL beam from the radio network node is lacking during a time window, transmitting a request to access another beam being a second best beam according to the performed beam tracking.

2. The method according to claim 1, wherein performing the beam tracking comprises performing measurements on reference signals for beams for the serving cell, and wherein the DL beam is selected based on the measured signal strength or measured signal quality on reference signals for respective beam.

3. The method according to claim 1, wherein the beam recovery process comprises:
    choosing a downlink reference signal in the DL beam.

4. The method according to claim 3, wherein the beam recovery process comprises:
    sending an uplink message to inform the radio network node of the DL beam of the chosen downlink reference signal.

5. The method according to claim 1, wherein the beam tracking further comprises collecting in the wireless device a channel state information-reference signal of the one or more beams.

6. The method according to claim 1, wherein detecting the beam failure process comprises detecting a physical downlink control channel, PDCCH, failure and/or a downlink beam failure.

7. The method according to claim 1, wherein the method comprises:
    receiving configuration data comprising a number of beams per cell to be possibly selected when beam failure is detected by the wireless device.

8. A non-transitory computer-readable storage medium, having stored thereon a computer program comprising instructions which, when executed on at least one processor, cause the at least one processor to:
    perform a beam tracking of the serving cell for tracking one or more beams of the serving cell based on measured signal strength or measured signal quality, wherein the beam tracking comprises collecting in the wireless device a snapshot and/or sample of a synchronization signal, SS, Block Burst or Burst Set;
    detect a beam failure process in the serving cell;
    in response to detection of the beam failure process, trigger a beam recovery process associated with a downlink, DL, beam for the serving cell, wherein the DL beam is selected based on the beam tracking performed prior to detecting the beam failure process; and
    when a confirmation for the selected DL beam from the radio network node is lacking during a time window, transmit a request to access another beam being a second best beam according to the performed beam tracking.

9. A wireless device for handling communication of the wireless device in a wireless communication network, wherein the wireless communication network comprises a radio network node configured to serve the wireless device in a serving cell, and wherein the wireless device comprises processing circuitry and a memory, said memory comprising instructions executable by said processing circuitry whereby said wireless device is operative to:
    perform a beam tracking of the serving cell for tracking one or more beams of the serving cell based on measured signal strength or measured signal quality, wherein the beam tracking comprises collecting in the wireless device a snapshot and/or sample of a synchronization signal, SS, Block Burst or Burst Set;
    detect a beam failure process in the serving cell;
    in response to detection of the beam failure process, trigger a beam recovery process associated with a downlink, DL, beam for the serving cell, wherein the DL beam is selected based on the beam tracking performed prior to detecting the beam failure process; and
    when a confirmation for the selected DL beam from the radio network node is lacking during a time window, transmit a request to access another beam being a second best beam according to the performed beam tracking.

10. The wireless device according to claim 9, wherein the wireless device is operative to perform the beam tracking by performing measurements on reference signals for beams for the serving cell, and wherein the DL beam is selected based on the measured signal strength or measured signal quality on reference signals for respective beam.

11. The wireless device according to claim 9, wherein the beam recovery process comprises to choose a downlink reference signal in the DL beam.

12. The wireless device according to claim 11, wherein the beam recovery process comprises to send an uplink message to inform the radio network node of the DL beam of the chosen downlink reference signal.

13. The wireless device according to claim 9, wherein the beam tracking further comprises to collect in the wireless device a channel state information-reference signal of the one or more beams.

14. The wireless device according to claim 9, wherein the wireless device is operative to detect the beam failure process by detecting a physical downlink control channel, PDCCH, failure and/or a downlink beam failure.

15. The wireless device according to claim 9, wherein the wireless device is operative to receive configuration data comprising a number of beams per cell to be possibly selected per cell when beam failure is detected by the wireless device.

\* \* \* \* \*